(12) United States Patent
Montague

(10) Patent No.: US 6,675,926 B2
(45) Date of Patent: Jan. 13, 2004

(54) INTEGRATED SEMI-INDEPENDENT SUSPENSION AND DRIVETRAIN SYSTEM FOR VEHICLES

(76) Inventor: Martin B. Montague, 19740 Three Notch Rd., Lexington Park, MD (US) 20653

( * ) Notice: Subject to any disclaimer, the term of this patent is extended or adjusted under 35 U.S.C. 154(b) by 240 days.

(21) Appl. No.: 09/983,015

(22) Filed: Oct. 22, 2001

(65) Prior Publication Data

US 2002/0063011 A1 May 30, 2002

Related U.S. Application Data

(63) Continuation-in-part of application No. 09/372,586, filed on Aug. 12, 1999, now Pat. No. 6,305,487
(60) Provisional application No. 60/096,530, filed on Aug. 13, 1998.

(51) Int. Cl.[7] ............................................... B60K 17/00
(52) U.S. Cl. ................ 180/350; 180/357; 280/124.106; 280/124.128; 188/17
(58) Field of Search ................................. 180/350, 351, 180/348, 357; 280/124.106, 124.116, 124.167, 124.128; 188/17, 18 R, 18 A

(56) References Cited

U.S. PATENT DOCUMENTS

| | | |
|---|---|---|
| 1,182,104 A | 5/1916 | Remy et al. |
| 1,345,421 A | 7/1920 | Van Vleet et al. |
| 3,292,943 A | 12/1966 | Crockett |
| 3,473,821 A | 10/1969 | Barenyi et al. |
| 3,605,929 A | 9/1971 | Rolland |
| 4,003,443 A | 1/1977 | Boughers |
| 4,429,760 A | 2/1984 | Koizumi et al. |
| 4,469,188 A | 9/1984 | Mita |
| 4,520,890 A | 6/1985 | Marier |
| 4,582,157 A | 4/1986 | Watanabe |
| 4,592,441 A * | 6/1986 | Marier et al. ............... 180/217 |
| 4,647,067 A | 3/1987 | Paquette et al. |

(List continued on next page.)

FOREIGN PATENT DOCUMENTS

| | | |
|---|---|---|
| DE | 3044899 A1 | 6/1982 |
| GB | 2116498 A | 9/1983 |
| IT | 520299 | 3/1955 |

OTHER PUBLICATIONS

"Student's Suspension Design Wins Collegiate Inventor Prize", *Engineering News*, Newsletter of the GW School of Engineering and Applied Science, Fall 1998, vol. 2, No. 2, p. 1.
Bob Jackson, "Where To Now?", *Motorcycle Product News*, Jul. 1998, vol. 24, No. 7, pp. 21–25.

*Primary Examiner*—Paul N. Dickson
*Assistant Examiner*—Toan To
(74) *Attorney, Agent, or Firm*—Nixon Peabody LLP; Thomas W. Cole; Daniel S. Song

(57) ABSTRACT

An integrated semi-independent suspension and drivetrain system including a swing arm with a swing mount, an axle assembly rotatable along a transverse axle rotation axis, an axle carrier for mounting the axle assembly, the axle carrier being rotatably mounted to the swing arm, a driven sprocket, a drive sprocket, a flexible coupling mechanically linking the driven sprocket to the drive sprocket, a roll movement device for allowing the flexible coupling to maintain the mechanical link between the driven and drive sprockets as the driven sprocket rolls about the suspension roll axis, and at least two shock mounts for mounting a shock absorber or a spring, the two shock mounts being positioned along sides of the axle carrier flanking the suspension roll axis at a distance away from the suspension roll axis. In another embodiment, the transverse axle rotation axis of the axle assembly is elevated above the suspension roll axis.

76 Claims, 10 Drawing Sheets

U.S. PATENT DOCUMENTS

| | | |
|---|---|---|
| 4,877,102 A | 10/1989 | Stewart |
| 5,107,952 A | 4/1992 | Matsubayashi et al. |
| 5,467,839 A | 11/1995 | Yoshio |
| 5,575,352 A | 11/1996 | Suzuki et al. |
| 5,845,918 A | 12/1998 | Grinde et al. |
| 5,871,218 A | 2/1999 | Lepage et al. |
| 5,878,479 A | 3/1999 | Dickerson et al. |
| 5,921,341 A * | 7/1999 | Atkins ........................ 180/350 |
| 6,286,619 B1 * | 9/2001 | Uchiyama et al. .......... 180/337 |
| 6,305,487 B1 * | 10/2001 | Montague ................... 180/350 |
| 6,364,048 B1 * | 4/2002 | McComber ................. 180/350 |
| 6,446,748 B1 * | 9/2002 | Suzuki ....................... 180/350 |
| 6,581,715 B2 * | 6/2003 | Montague ................... 180/350 |

\* cited by examiner

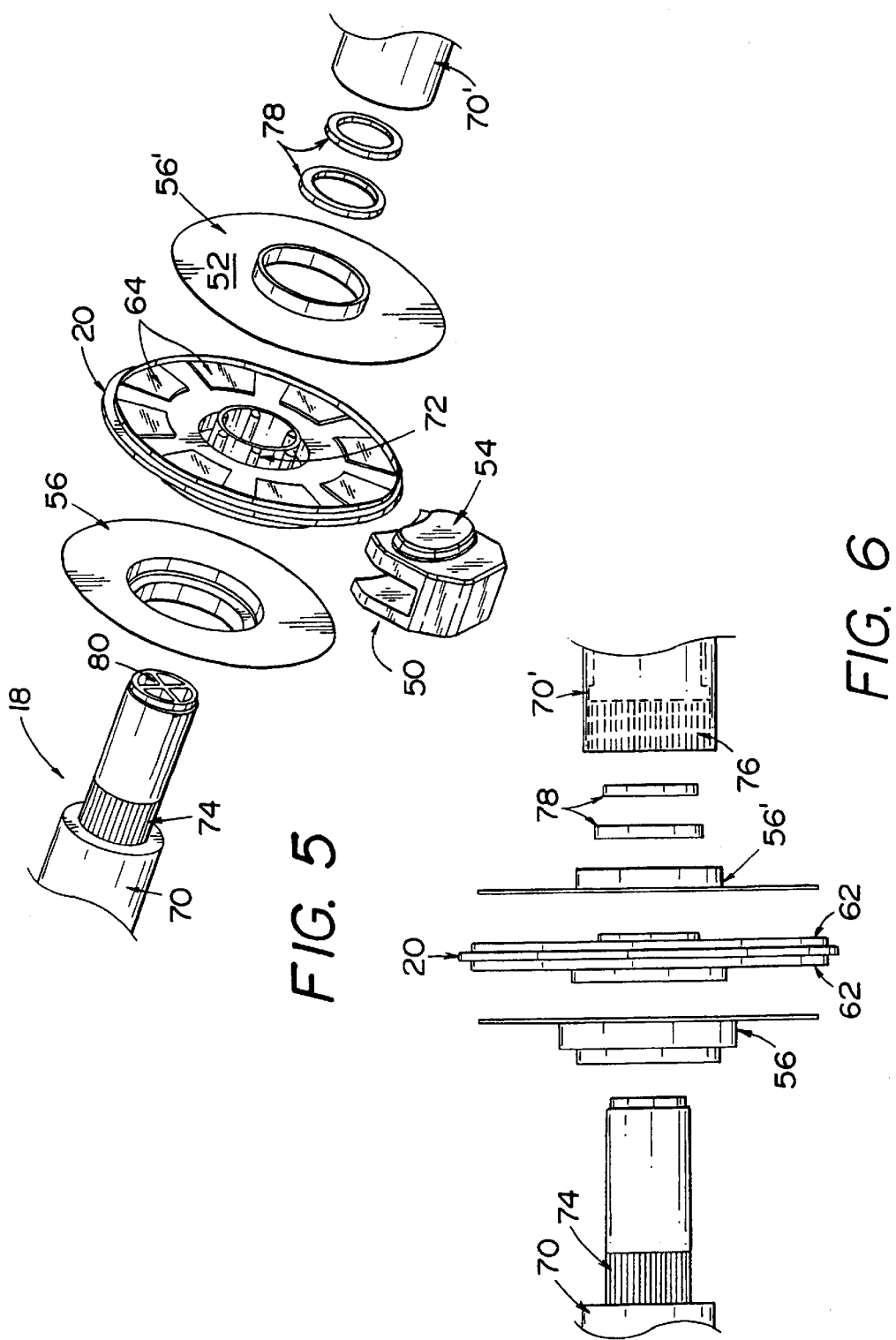

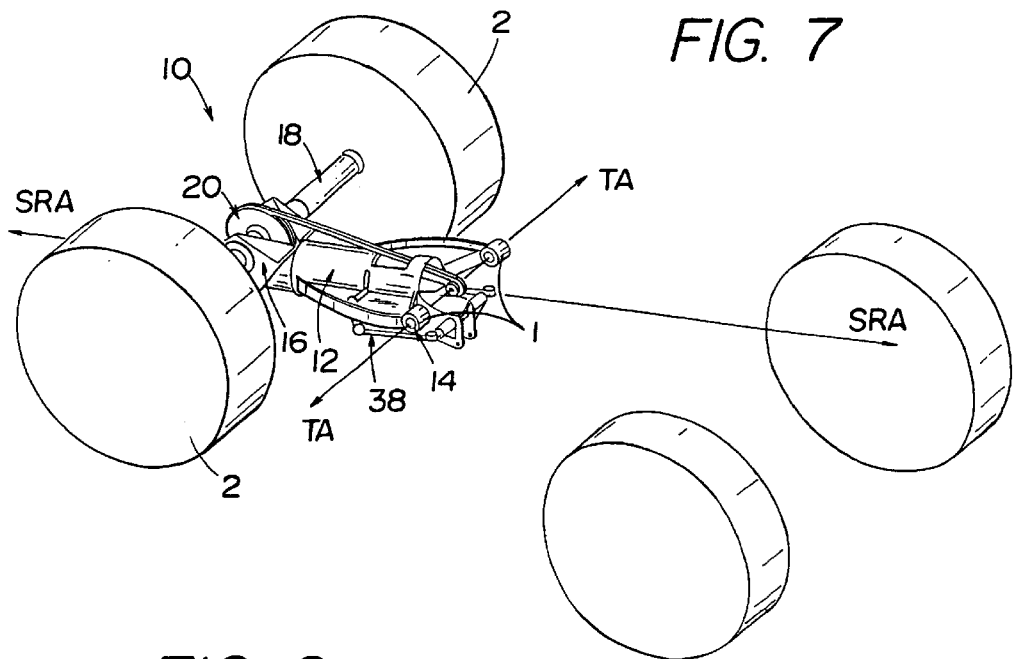
FIG. 7
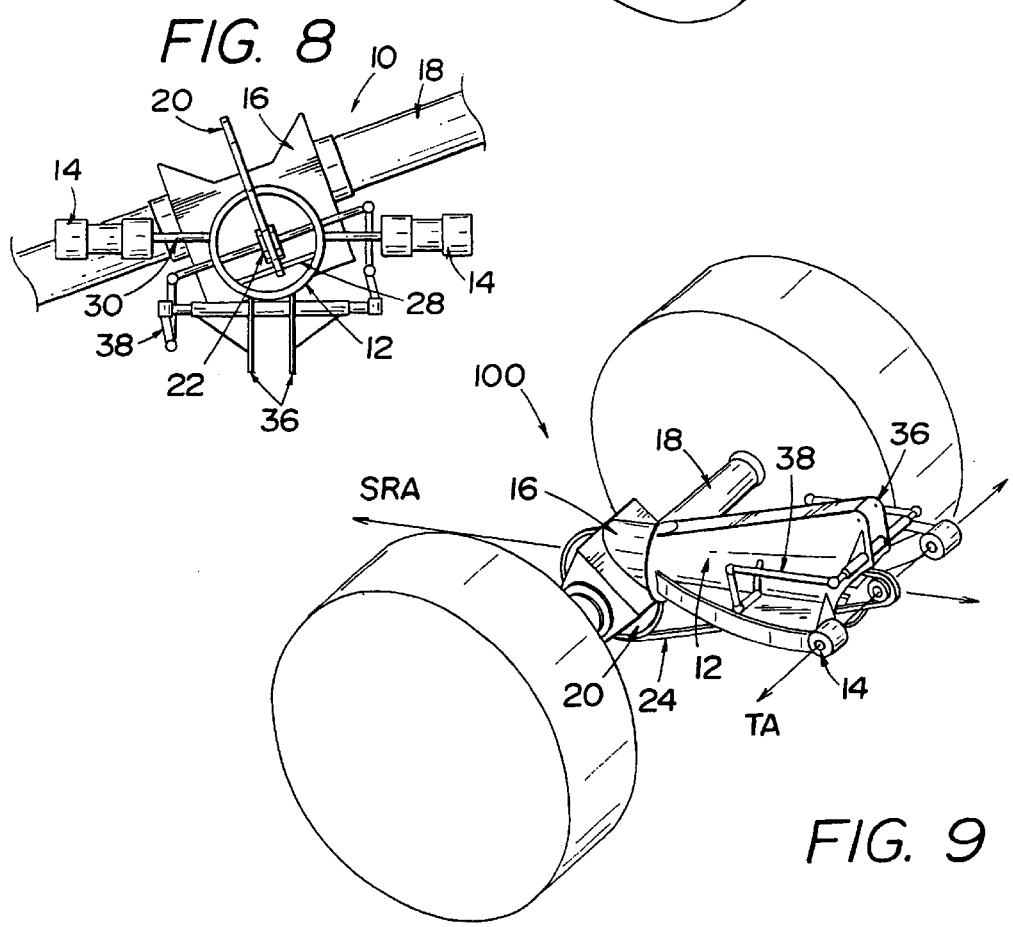
FIG. 8
FIG. 9

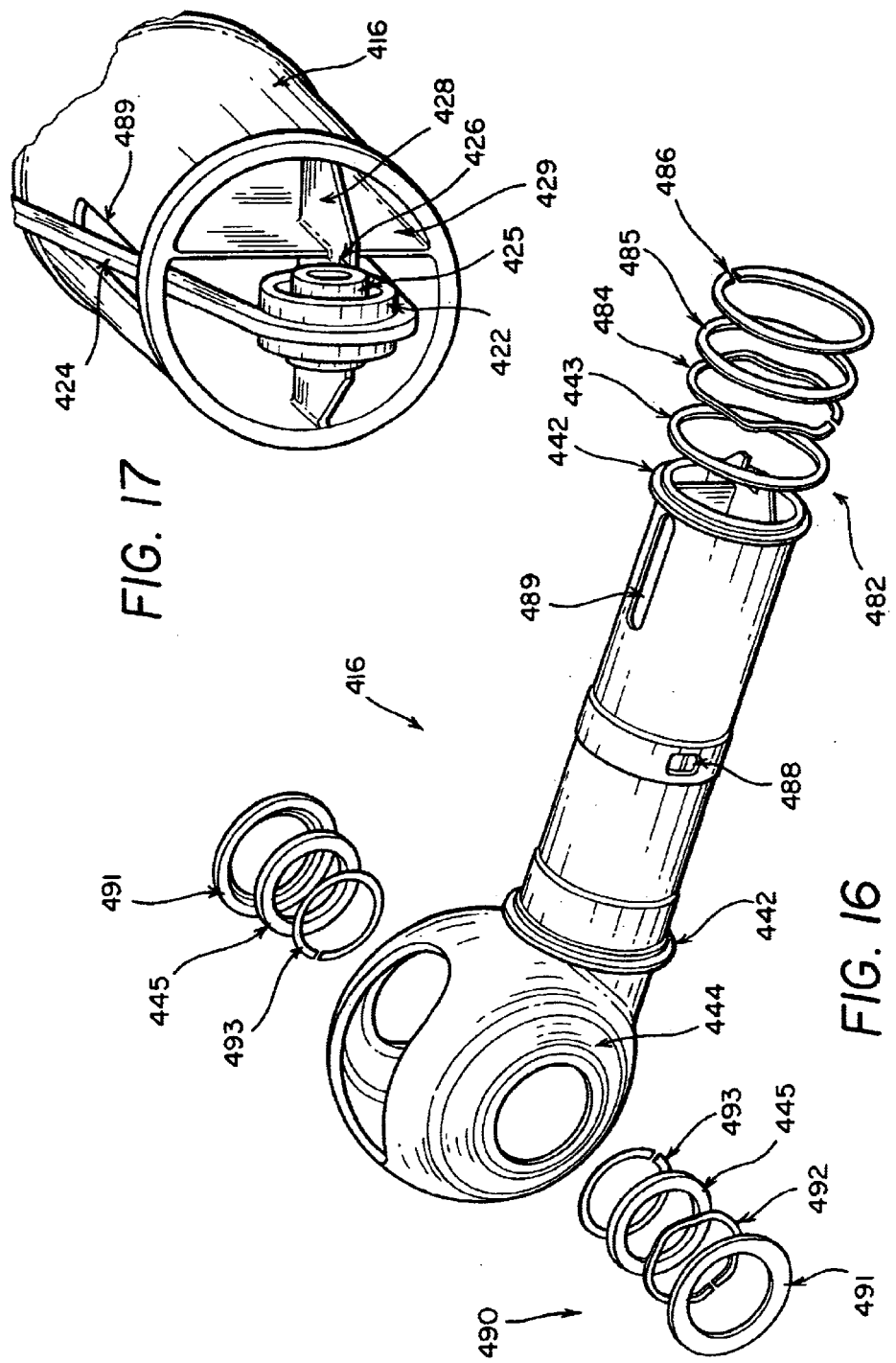

INTEGRATED SEMI-INDEPENDENT SUSPENSION AND DRIVETRAIN SYSTEM FOR VEHICLES

This application is a Continuation-In-Part application based on U.S. patent application Ser. No. 09/372,586 filed on Aug. 12, 1999, now U.S. Pat No. 6,305,487 which is based on application Ser. No. 60/096,530, filed Aug. 13, 1998.

BACKGROUND OF THE INVENTION

1. Field of the Invention

The present invention is related to the field of vehicle suspensions and drivetrains. More specifically, the invention relates to semi-independent suspensions and drivetrains for vehicles.

2. Description of Related Art

Numerous designs for suspension and drivetrain systems are known and used in the manufacturing of various types of vehicles. It is known in vehicle engineering that particular designs provide specific advantages in particular applications. Most of the developments in the designing of suspension and drivetrain systems have been centered around automotive applications.

In recent times, smaller specialized all-terrain vehicles (a.k.a. ATVs) have gained in popularity as recreational and utility vehicles. As the popularity of ATVs has increases, so to have the performance demands placed upon them. Consequently, manufacturers of ATVs have responded with performance increases in certain areas, such as, increases in engine power and vehicle size. Such increases in engine output and vehicle size translate into increased inertial effects and extreme dynamic loading. These more powerful, massive ATVs usually require more skill and/or effort by the operator to maintain control during operation. However, ATV manufacturers have had very little success in modifying the previously mentioned automotive suspension and drivetrain designs to optimally adapt them for ATV use.

ATVs require the development of specialized suspension and drivetrain systems to improve operator controllability while continuing to withstand the rugged demands of their off-road application. Typically, ATVs have one or two front wheels and two rear wheels axially mounted on a solid axle in a dependent manner by a swing arm that pivots about a transverse axis of the ATV. Such a system is illustrated in U.S. Pat. No. 4,582,157 to Watanabe. The limitation and disadvantage of this suspension and drivetrain design is that the two rear wheels are mounted on a solid axle, which is axially coupled to a swing arm in such a way that it is only allowed to pivot about, and constrained to be parallel with, the transverse axis of the ATV.

Currently, the three and four wheeled ATVs using the '157's design, yield three undesirable characteristics that have negative effects on vehicle stability. The first two of these undesirable characteristics are in effect during both forward and turning or cornering operations of the ATV. These two characteristics are termed in vehicle engineering as suspensions having a roll center at ground level and possessing infinite roll resistance.

Having the roll center at ground level results in poor roll stability because the center of gravity (a.k.a. CG) of the vehicle can only be designed far above the vehicle's longitudinally oriented roll axis, potentially resulting in increased dynamic roll moment (a.k.a. torque). Infinite roll resistance implies that the suspension doesn't incorporate any roll motions to absorb roll energies. This means that all of the energy that is transferred via the unsprung mass (a.k.a. unsprung weight) from dynamic roll loading, is transferred directly into rolling the sprung mass (a.k.a. sprung weight) of the vehicle. Thus, infinite roll resistance translates into a harsh ATV dynamic roll response that is often difficult to predict and control by the operator. Even during simple forward motion, operating such an ATV can be like riding a twisting, bucking bronco when traversing uneven off-road terrain.

The third undesirable characteristic comes into play when the solid axle drivetrain of the '157 patent is used and the operator is attempting to negotiate the ATV to turn or corner. For the operator to negotiate the ATV around a turn, a sufficient turning moment must be generated by the operator to overcome all resistive turning moments. Usually, these resistive turning moments are primarily caused by inertial effects, which are overcome by the operator simply turning the front steering mechanism of the ATV. This steering action imparts the needed centripetal reaction from the front tires to overcome the inertial turning moments that work to maintain forward motion of the ATV.

This third undesirable characteristic, which is imparted due to the solid axle constraining the rear wheels to rotate at the same speed, is a mechanical counteracting turning moment, and it's contribution is only present while both rear tires are in sufficient traction with the terrain. This mechanical counteracting turning moment causes the ATV to experience a condition termed as understeer. For the operator to better negotiate this ATV to turn, one must overcome this understeer effect. This is typically accomplished by the operator leaning outward to shift the CG of the sprung mass such that a sufficient roll moment is imparted to cause the inside rear tire to lose traction with the terrain, thereby decoupling the mechanical counteracting turning moment caused by the solid axle. Thus, the operator must perilously put the ATV in an unsafe and unstable inertia induced roll condition in order to eliminate or reduce the mechanically induced understeer effect.

The sudden removal of this counteracting turning moment results in a nearly instantaneous transition from a quasi-static understeer condition to a sharp oversteer condition. This oversteer works to worsen the preexisting unstable inertia induced roll condition. Depending on the skill and strength of the operator, this situation can result in a rapid loss of operator roll control and vehicle rollover.

In light of the disadvantages inherent in the above suspension and drivetrain system, it has been recognized that significantly improved vehicle roll dynamics could be obtained if the rear suspension was designed such that the rear axle could also pivot about the vehicle's longitudinally oriented roll axis. These types of semi-independent suspensions offer variably finite roll resistance characteristics which are desirable for increased roll stability and traction.

The most important function of any suspension is to keep the tires in contact with the ground, while maximizing stability. Semi-independent rear suspension motion is all that is necessary for off-road ATV applications because the tires used are of low pressure, and they have rounded shoulders with radical tread patterns extending well into the sidewall region. These tire characteristics nullify the need of having a fully independent suspensions because the tires provide good compliance and traction with the terrain, even if the motion of one side of the suspension moderately affects the other.

In this regard, U.S. Pat. No. 5,845,918 to Grinde et al. discloses an ATV with a semi-independent rear suspension which allows the rear axle to pivot about the vehicle's longitudinal centerline as well as about a transverse axis. This suspension design has been found to substantially improve handling performance of the ATV by giving improved traction on uneven terrain and increased vehicle roll stability. In particular, during cornering, these semi-independent suspensions help roll stability because they postpone the initiation of the transition from understeer to oversteer. For the operator, a quasi-static understeer condition is easier to control than the rapid transition condition to a sharp oversteer.

The suspension system of the '918 patent however, does not totally resolve the third undesirable characteristic explained above, since it too uses a solid rear axle. In addition, the suspension design of the '918 patent severely limits the travel of the rear axle since the travel is limited by the travel of the coil-over shocks, which are displaced in near one to one ratio with the displacement of the rear axle. Thus, the suspension disclosed in the '918 patent is undesirable for ATV applications, especially for high performance applications, where amount of travel in a suspension is considered critical for optimal traction, energy absorption, and operator control.

Furthermore, the drivetrain of the '918 patent is like the other prior art suspension and drivetrain systems which typically utilize a drive shaft with a final drive bevel gear which are housed in a shaft housing and a final drive housing. As can be easily appreciated, these components are all made of metal and are quite massive thereby adding to the unsprung mass of the ATV.

Increased mass translates into power robbing inertial drivetrain losses, poor suspension response, and decreased overall power to mass (a.k.a, power to weight) ratio, which is very critical in high performance racing applications where maximum acceleration is imperative. More specifically, it is important to minimize the unsprung mass so that wheel hop frequencies are much higher than the sprung mass natural frequencies. This helps to ensure that the sprung mass remains relatively stable during wheel hop. Thus, a lesser unsprung mass provides superior suspension response and vehicle handling characteristics.

Lastly, because of the bulkiness of the suspension components and the presence of the drive shaft housing and the final drive housing in the prior art designs, there is no effective manner for providing a cost effective precision braking system for the rear wheels. In particular, it is well recognized that disk brake systems are especially desirable in high performance applications. Generally, disk brake systems provide more precise braking control than drum brake systems and are less massive, thus again, minimizing the unsprung mass and drivetrain inertial effects.

However, because the drive shaft housing and the final drive housing are generally positioned substantially center of the rear axle in a conventional ATV, they pose severe packaging constraints for a disk braking system. Thus, many ATVs incorporate the easier to package, yet less precise and more massive drum brakes at the outward ends of the axle housing, the only place possible for robust braking. Having these added braking masses outward from the central region of the axle further worsens the unsprung mass dynamic roll response by increasing the unsprung mass radius of gyration (a.k.a. polar moment of inertia).

One method of reducing the unsprung mass and reduce the bulkiness of the drivetrain is to utilize a chain and sprocket drive coupling such as those used in motorcycles, where they have proven to be superior to all other methods of drivetrain coupling for off-road applications. Chains and sprockets are less massive as compared to drive shafts and final drive bevel gears, and they provide a very responsive coupling of the drive wheels to the transmission. They also take up only minimal amount of space and impose only minimal packaging constraints for a disk braking system. Further, flexible couplings, including chains, absorb drivetrain shock, in the form of strain energy, providing a smoother coupling than that provided by shaft and gear drivetrain systems which often induce shock themselves because of gear lash issues.

However, the use of a conventional chain and sprocket drive system does not allow the rear axle to pivot about the vehicle's longitudinally oriented roll axis, for these chain couplings require that their elements remain planar. These conventional chain drive system typically incorporate a drive sprocket which is attached to the transmission and is in a fixed orientation, and a driven sprocket which spins about the drive axis and is constrained to pivot about, and remain parallel to, the rear transverse axis.

In other applications, special sprockets have been designed to allow the use of a chain and sprocket drivetrain while providing some amount of roll movement. Such drive sprockets are illustrated in U.S. Pat. No. 4,469,188 to Mita which is directed to an articulated tricycle including a drivetrain with a drive sprocket located about a shaft with a constant velocity universal joint employed to allow some flexibility between the sprocket and the shaft. The driven sprocket of the '188 patent is coupled to the solid rear axle by a chain for driving the rear wheels such that the front body of the tricycle may roll slightly relative to a rear body of the tricycle. However, application of the chain and sprocket drivetrain of the '188 patent has been found to be very difficult and inadequate in applications where large suspension travel and low unsprung mass are desired such as in an ATV application. The rear wheels of the '188 patent are supported primarily through the constant velocity universal joint housing and is inadequately supported for off road use. Furthermore, relative to the embodiment being discussed, the '188 patent, again, does not totally resolve the third undesirable characteristic explained above, since it too uses a solid rear axle, albeit because the two rear wheels are so close together and are so small, the resistance will be smaller than the other aforementioned prior art. Moreover, there are no easy ways to provide for the superior characteristics of a disk braking system.

U.S. Pat. No. 4,877,102 to Stewart discloses a multi-wheeled vehicle suspension and drive mechanism for ATVs including a rear axle assembly which allows the rear axle to roll. The '102 patent also discloses a sprocket and chain drive system including a driven sprocket with a universal joint which is mounted to the axle and aligned with the drive sprocket by a pivot arm which is mounted to the swing arm. Whereas the suspension and drive mechanism of the '102 patent allowed larger suspension travel and roll than the design of the '188 patent, the design disclosed in the '102 patent is complicated, requiring many numerous components. In particular, because the design disclosed in the '102 patent includes an axle housing and its associated components, which are all quite massive, and they counteract some of the benefits of using a chain drive in the first place since all of these additional components act to increase unsprung mass. In addition, because of the complexity, the design disclosed in the '102 patent is cost prohibitive to manufacture. Furthermore, because of the relative complexity of the system, it has been found to be unreliable, especially since dirt and debris tended to accumulate in the various components of the universal joint as well as the other exposed components. Lastly, it still fails to resolve the third undesirable characteristic explained above, since it too uses a solid rear axle. Consequently, this suspension and drive mechanism has not been readily accepted and is not commonly used.

Thus, despite the many disadvantages and limitations of commonly used ATV suspensions and drivetrains, they remain in use because there have yet to be any known practical alternatives which will practically avoid the aforementioned undesirable characteristics. Further, these commonly used rear suspension and drivetrain systems are accepted because some offer the required large range of suspension travel needed for added ground clearance and energy absorption. They are simple, tough, and packaged to minimize effects of collision with ground debris.

There are many other suspension and drive designs that could offer improved roll stability characteristics but at the expense of decreased suspension travel, reduced available ground clearance, and less energy absorption ability. These on-road, automotive type suspension systems are optimally suited for street applications where flat faced lower profile tires are used. Further, these designs are more complex, massive, and require packaging that is more vulnerable to collision with ground debris.

For the foregoing reasons, there exists an unfulfilled need for an improved semi-independent suspension and drivetrain system for vehicles which will enable improved roll and traction performance by allowing the axle to pivot about a vehicle's longitudinally oriented roll axis as well as a transverse axis. In addition, there exists an unfulfilled need for such a suspension and drivetrain system which will allow extensive range of suspension travel. Furthermore, there exists an unfulfilled need for such a suspension and drivetrain which will minimize the resistive turning moments associated with the usage of a solid rear axle. Still further, there exists an unfulfilled need for such a suspension and drivetrain which will enable the use of a, proven to be superior, flexible coupling drivetrain, such as a flexible chain coupling drivetrain, including a drive sprocket and a driven sprocket. Moreover, there exists an unfulfilled need for such a suspension and drivetrain which will attain the above objectives and include provisions for a disk brake system. Lastly, there exists an unfulfilled need for such a suspension and drivetrain which is simple, compact, robust, and cost effective.

SUMMARY OF THE INVENTION

In view of the foregoing, one advantage of the present invention is in providing an improved semi-independent suspension and drivetrain system for vehicles which will enable improved roll and traction performance by allowing the axle to pivot about a vehicle's longitudinally oriented roll axis as well as the transverse axis.

Another advantage of the present invention is in providing such an improved suspension which will allow extensive range of suspension travel.

A third advantage of the present invention is in providing such an improved suspension and drivetrain system which will minimize the resistive turning moments associated with the usage of a solid rear axle.

A fourth advantage of the present invention is in providing an improved suspension and drivetrain system which will minimize the unsprung mass of the vehicle.

A fifth advantage of the present invention is in providing such an improved suspension and drivetrain system enabling the use of a flexible coupling drivetrain, such as a flexible chain coupling drivetrain, including a drive sprocket and a driven sprocket.

A sixth advantage of the present invention is in providing an improved suspension and drivetrain system which will attain the above objectives and include optimal provisions for a disk brake system.

A seventh advantage of the present invention is in providing such an improved suspension and drivetrain system which is simple, compact, robust, and cost effective.

In accordance with preferred embodiments of the present invention, an integrated semi-independent suspension and drivetrain system for a vehicle is providing including a swing arm with a swing mount for pivotally mounting the swing arm to the vehicle, an axle assembly rotatable along a transverse axle rotation axis, an axle carrier for mounting the axle assembly, the axle carrier being rotatably mounted to the swing arm to allow the axle assembly to roll about a suspension roll axis, a driven sprocket substantially centrally attached to the axle assembly for rotating the axle assembly, a drive sprocket for transferring rotational power to the driven sprocket, a flexible coupling mechanically linking the driven sprocket to the drive sprocket to allow transfer of rotational power from the drive sprocket to the driven sprocket, a roll movement means for allowing the flexible coupling to maintain the mechanical link between the driven sprocket and the drive sprocket as the driven sprocket rolls about the suspension roll axis with the axle carrier, and at least two shock mounts, each for mounting a shock absorber or a spring, the two shock mounts being positioned along sides of the axle carrier flanking the suspension roll axis on two sides at a spaced distance away from the suspension roll axis.

In accordance with one embodiment of the present invention, the swing arm and the axle carrier are substantially tubular in shape and the axle carrier is dimensioned to be rotatably mounted to the swing arm, with at least one bearing mounted between the axle carrier and the swing arm to reduce friction between the axle carrier and the swing arm. The swing arm may include one swing mount which is attached to the swing arm by at least one of a lateral reinforcement rib and a laterally inclined reinforcement rib which may also include a perpendicularly oriented reinforcement rib. The axle carrier and/or the swing arm may include an internal reinforcement web extending substantially therethrough.

In accordance with another embodiment, the integrated semi-independent suspension and drivetrain system includes an extensible adjustment mechanism adapted allow adjustment of axial position and preload of the axle carrier relative to the swing arm. In this regard, the adjustment mechanism may include an adjustable axle carrier-to-swing arm bearing constraint on the axle carrier and/or the swing arm. The bearing constraint mechanism may include a preloading wave ring, a retaining ring, a shim ring, and/or a bearing adapter ring. In yet another embodiment, the axle carrier includes a rotatable adjustment mechanism to allow adjustment of radial position of the axle assembly relative to the axle carrier. The rotatable adjustment mechanism preferably includes at least one radial eccentric bearing constraint.

The flexible coupling may be a drive chain or a flexible belt and the axle carrier may include a tensioner for reducing slack in the flexible coupling, the tensioner preferably engages a lower portion of the flexible coupling. The roll movement means includes a movable joint centrally disposed on the drive sprocket to allow alignment of the drive sprocket relative to the driven sprocket. In this regard, the movable joint may be a constant velocity (CV) joint, a universal joint (U-Joint), and/or a curvic spline joint (CSJ). In this regard, a guide adapted to align the drive sprocket with the driven sprocket may also be provided, the guide being provided on a guide mount which extends from the axle carrier to the drive sprocket. The guide may be a cutaway provided on an edge of the guide mount or include a thrust bearing and/or a roller mounted on the guide mount.

In accordance with another embodiment of the present invention, the integrated semi-independent suspension and drivetrain system may further include an axle bearing that supports the axle assembly and a bearing preload adjuster adapted to allow adjustment of relative axle bearing preload between the axle assembly and the axle carrier. In this regard, the bearing preload adjuster may include an adjustable axle bearing constraint on at least one of a left axle, a right axle, and the axle carrier where the adjustable axle bearing constraint includes at least one of an eccentric bearing constraint, a preloading wave ring, a shim ring, and a retaining ring.

In accordance with yet another embodiment of the present invention, the axle assembly includes a left axle and a right axle and the driven sprocket includes a differential gear system to allow the left axle to rotate at a different rotational speed compared to the right axle. The differential gear system preferably comprises a plurality of pinion gears, at least one of the left axle and the right axle includes a sun gear at one end for engaging the plurality of pinion gears and at least one of the left axle and the right axle includes a ring gear at one end for engaging the plurality of pinion gears. The driven sprocket preferably includes at least one pinion constraint member at a hub of the driven sprocket for retaining the pinion gears and the pinion gears are caged between the sun gear and the ring gear. In this regard, the pinion gears rotate on axes that remain parallel to the transverse axle rotation axis. The left axle and the right axle are preferably supported relative to one another in an inter-cantilevered manner where a portion of one of the left axle and the right axle is received in, and mutually supported by other of the left axle and the right axle, further including at least one bearing therein between.

In accordance with still another embodiment of the present invention, the integrated semi-independent suspension and drivetrain system further including a brake assembly for exerting a braking force on the driven sprocket to resist rotation of the driven sprocket. In this regard, the driven sprocket includes a brake surface, and the brake assembly includes a brake caliper with brake pads for frictionally engaging the brake surface of the driven sprocket. The brake caliper may be mounted on the axle carrier or may be a floating brake caliper. In one preferred embodiment, the driven sprocket includes at least one of an axially extending flanges and radially extending flanges adjacent to the flexible coupling around a periphery of the driven sprocket. In such an embodiment, the driven sprocket includes an axially extending flange, a radial dimension of the axially extending flange being smaller than a radial dimension of a plurality of teeth on the driven sprocket, while the radial dimension of the radially extending flanges is at least equal to a radial dimension of a plurality of teeth on the driven sprocket.

In addition, or alternatively, the brake assembly includes a left brake disk disposed on a left side of the driven sprocket and is adapted to frictionally engage a left side of the driven sprocket, and a right brake disk disposed on a right side of the driven sprocket and is adapted to frictionally engage a right side of the driven sprocket, the left brake disk and the right brake disk preferably being rotationally fixed relative to the axle assembly. In this regard, the left brake disk and the right brake disk are floating disks and the caliper is a floating caliper. The driven sprocket may also include a friction material that frictionally engage the left brake disk and the right brake disk. For instance, floating friction disk disposed between the left brake disk and the driven sprocket and another floating friction disk disposed between the right brake disk and the driven sprocket may be provided. Alternatively, the left brake disk and the right brake disk each include a friction material on an inner surface for frictionally engaging the driven sprocket.

The integrated semi-independent suspension and drivetrain system in accordance with yet another embodiment of the present invention may also include a peripheral opening on a peripheral surface of at least one of the swing arm and the axle carrier to allow at least a segment of the flexible coupling extending between the driven sprocket and the drive sprocket to be outside of at least one of the swing arm and the axle carrier. In this regard, the peripheral opening may preferably be dimensioned in a manner that a clearance space exists between the flexible coupling and the peripheral opening throughout a range of motion of the flexible coupling, the range of motion being defined by rotation of the axle carrier and alignment of the drive sprocket with the driven sprocket.

In accordance with still another embodiment, the present invention provides an integrated semi-independent suspension and drivetrain system for a vehicle where the transverse axle rotation axis of the axle assembly is elevated above the suspension roll axis. The swing arm and the axle carrier may be substantially tubular in shape and the axle carrier may be dimensioned to be rotatably mounted to the swing arm, while the axle carrier includes two axle mounting flanges for mounting the axle assembly, the driven sprocket being positioned thereinbetween. The axle carrier may include at least one shock mount for mounting at least one of a shock absorber and a spring which is positioned substantially along a midportion of the axle carrier at a spaced distance away from the suspension roll axis. Preferably, the two shock mounts are provided which are positioned flanking the suspension roll axis on two sides at a spaced distance from the suspension roll axis so that when springs are mounted to the two shock mounts, the springs resist roll rotation of the axle carrier relative to at least one of the swing arm and the vehicle.

The integrated semi-independent suspension and drivetrain system may further including a stabilizer bar for establishing a mechanical linkage between the axle carrier and at least one of the swing arm and the vehicle in a manner to resist roll rotation of the axle carrier relative to at least one of the swing arm and the vehicle. A damper to dampen rotation of the axle carrier relative to the swing arm may also be provided.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 5 is a perspective assembly view of the driven sprocket in accordance with one embodiment of the present integrated semi-independent suspension and drivetrain system.

FIG. 6 is a front assembly view of the driven sprocket of FIG. 5 but with the disk brake caliper removed.

FIG. 7 is a perspective view showing where the integrated semi-independent suspension and drivetrain system of FIG. 1 is positioned and mounted in a vehicle having four wheels.

FIG. 8 shows a frontal view of the integrated semi-independent suspension and drivetrain system of FIG. 7 during vehicle roll as viewed along the suspension roll axis.

FIG. 9 is a perspective view of another embodiment of the integrated semi-independent suspension and drivetrain system of FIG. 1 mounted in an inverted position.

FIG. 16 is an exploded assembly view of the axle carrier in accordance with one embodiment of the present invention with an extensible adjustment mechanism and a bearing preload adjuster.

FIG. 17 is an enlarged view of the end of the axle carrier which clearly shows the drive sprocket, guide, and an internal reinforcement web.

FIG. 18 is a side perspective view of an axle carrier in accordance with another embodiment of the present invention including a rotatable adjustment mechanism having an eccentric bearing constraint.

DETAILED DESCRIPTION OF THE INVENTION

Figure 1:
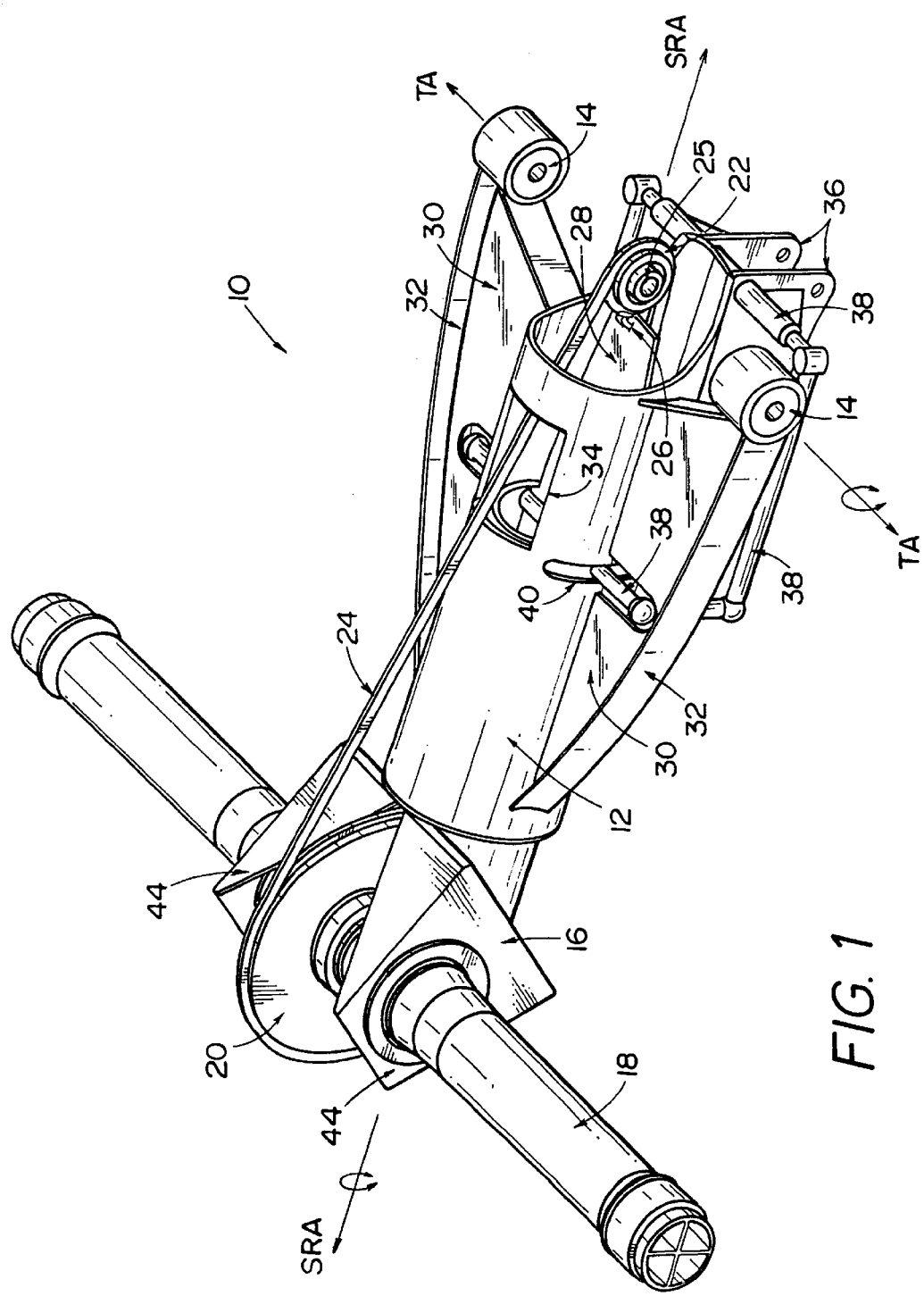
FIG. 1 is a perspective view of an integrated semi-independent suspension and drivetrain system in accordance with one embodiment of the present invention.

FIG. 1 illustrates an integrated semi-independent suspension and drivetrain 10 for vehicles in accordance with one embodiment of the present invention which will obtain the above noted objectives while avoiding the disadvantages of the prior art suspension and drivetrain designs. In particular, as will be discussed in further detail below, the integrated semi-independent suspension and drivetrain 10 will allow the rear axle to pivot about the vehicle's longitudinally oriented roll axis as well as the transverse axis thereby providing superior handling performance and extensive range of suspension travel. In addition, the illustrated embodiment of the present invention eliminates the limitations caused by the solid rear axle, minimize the unsprung mass of the vehicle, allow the use of a flexible coupling drivetrain, and allow provisions for a disk brake system. Furthermore, it will be evident that all of these objectives can be obtained in a suspension and drivetrain which is simple, compact, robust, and cost effective. Initially, it should be noted that FIG. 1 illustrates only one embodiment of the present invention which incorporates numerous features which will be described in further detail below. However, it should be recognized that the present invention may also be practiced in other embodiments where some of these features are omitted or modified. Moreover, whereas the present invention is particularly useful in ATV applications as discussed in the Background, the present invention is not limited to such applications but may be used in any vehicle or device which will benefit from having a semi-independent suspension and drivetrain system that is simple, compact, robust, and cost effective.

Figure 2:
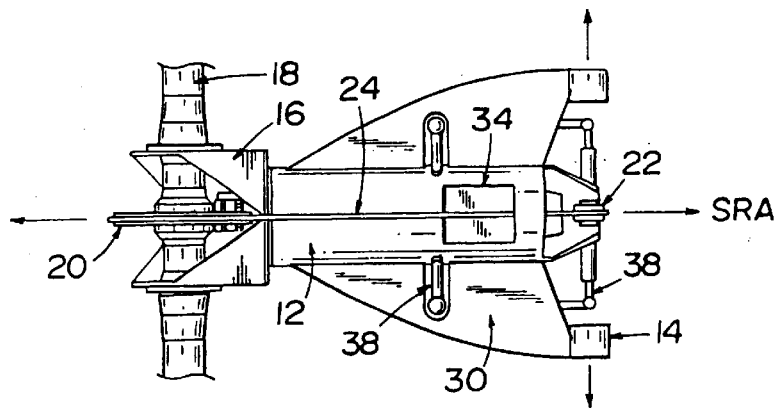
FIG. 2 is a top view of the integrated semi-independent suspension and drivetrain system of FIG. 1.

As clearly shown in FIGS. 1 and 2, one embodiment of the integrated semi-independent suspension and drivetrain 10 in accordance with the present invention includes a swing arm 12 with swing mounts 14 which pivotally mount the swing arm 12 to a vehicle (not shown) to allow the suspension and drivetrain 10 to pivot about the transverse axis TA. The suspension and drivetrain 10 also includes an axle carrier 16 for mounting an axle assembly 18, the axle carrier 16 being rotatably mounted to the swing arm 12 to allow the axle assembly 18 to roll about a suspension roll axis SRA. As can be seen, the suspension and drivetrain 10 includes a driven sprocket 20 substantially centrally attached to the axle assembly 18 for rotating the axle assembly 18 and a drive sprocket 22 for transferring rotational power to the driven sprocket 20. This transference of rotational power is obtained in the illustrated embodiment via a flexible coupling 24 which mechanically links the driven sprocket 20 to the drive sprocket 22. In this embodiment, the flexible coupling 24 is a flexible chain coupling. However, in other embodiments, a drive belt or other flexible coupling which is appropriate for transferring rotational power may also be used. In such an embodiment utilizing a drive belt, the driven sprocket 20 and drive sprocket 22 would actually be pulleys which engage the drive belt. Thus, whereas the specific embodiment described herein and shown in the drawings utilize conventional flexible chain coupling with a driven sprocket 20 and drive sprocket 22, other flexible couplings may also be used in practicing the present invention in other embodiments. In this regard, the terms driven sprocket 20 and the drive sprocket 22 should be understood and is used in the general sense to include such alternatives as pulleys.

It should be readily apparent that in the present illustrated embodiment utilizing a conventional flexible chain coupling, the axle carrier 16 is rotatably mounted to the swing arm 12, thus allowing the axle assembly 18 to roll about a suspension roll axis (SRA). Consequently, a special provision should be made in order to allow the flexible coupling 24, which may require planar orientation, to maintain the mechanical link between the driven sprocket 20 and the drive sprocket 22. In this regard, a roll movement means such as a constant velocity (a.k.a. CV) joint 25 may be provided to maintain the mechanical link between the driven sprocket 20 and the drive sprocket 22 as the driven sprocket 20 rolls about the suspension roll axis SRA with the axle carrier 16. As can be seen, in this embodiment, the CV joint 25 is centrally disposed on the drive sprocket 20 to allow maintenance of planar alignment of the drive sprocket 22 relative to the driven sprocket 20 as the driven sprocket 20 rolls about the SRA. In this regard, the present embodiment also includes a CV guide such as rollers 26 that facilitate maintenance of planar alignment of the drive sprocket 22 with the driven sprocket 20. The rollers 26, or other CV guide device, may be mounted to a CV guide mount 28 which extends from the axle carrier 16 to the drive sprocket 22 through the swing arm 12. In the illustrated embodiment, the rollers 26 contact two surfaces of the drive sprocket 22 to align the drive sprocket 22 with the driven sprocket 20. In other embodiments, the CV guide may include additional rollers (not shown) which can be mounted at a 90 degree offset, or any other degree offset, from the rollers 26 to minimize any tendency for misalignment of the drive sprocket 22. Yet in another embodiments, bearings such as thrust bearings or combination of bearings and rollers may be provided, or more generally, any combination and orientation of friction or non-friction aligning bearing elements. Furthermore, it should also be recognized that in certain embodiments, the CV joint 25 and/or CV guide device may not even be necessary in order to allow the axle carrier 16 to roll. This embodiment is especially applicable when a drive belt is used as the flexible coupling 24.

As also illustrated in FIGS. 1 and 2, the integrated semi-independent suspension and drivetrain system 10 of the present embodiment includes two swing mounts 14 which are attached to the swing arm 12 by lateral reinforcement ribs 30 which also include vertical reinforcement ribs 32. These lateral reinforcement ribs 30 provide added structural rigidity to the suspension and drivetrain system 10. As can be seen, the swing arm 12 is substantially tubular in shape and includes a peripheral opening 34 to allow at least a segment of the flexible coupling 24 to extend outside of the swing arm 12. As can be readily appreciated, the peripheral opening 34 should be properly dimensioned in a manner that a clearance space exits between the flexible coupling 24 and the peripheral opening 34 throughout a range of motion of the flexible coupling 24, the range of motion being defined by rotation of the axle carrier 16 and alignment of the drive sprocket 22 with the driven sprocket 20. In other words, because the position of the flexible coupling 24 varies depending on the amount of roll of the axle carrier 16 (and correspondingly, the drive sprocket 22), the peripheral opening 34 should be dimensioned correspondingly so that interfering contact between the flexible coupling 24 and the swing arm 12 would not occur. In alternative embodiments, the flexible coupling 24 may extend outside of the axle carrier 16 and/or the swing arm 12. In such an embodiment, the axle carrier 16 and/or the swing arm 12 may be provided with peripheral opening(s) such that a clearance space exits between the flexible coupling 24 and the peripheral opening (s) throughout a range of motion of the flexible coupling 24.

The integrated semi-independent suspension and drivetrain system 10 in accordance with the illustrated embodiment may also include a shock mount 36 proximate to the drive sprocket 22 for mounting a mono-shock absorber (not shown) or other shock absorber and/or spring device. In addition, the integrated semi-independent suspension and drivetrain system 10 also includes a stabilizer bar 38 thus establishing a mechanical linkage between the axle carrier 16 and the swing arm 12 in a manner to resist rotation of the axle carrier 16 relative to the swing arm 12. In the illustrated embodiment, the stabilizer bar 38 is attached to the swing arm 12 proximate to the shock mount 36 and is also attached to the axle carrier 16 through peripheral slots 40 provided on the swing arm 12. Further, any energy storage or dampening device, that may include coil springs, liquid or gas operated dampers, friction dampers may be linked in parallel or series with, or in place of the stabilizer bar to modify roll resistance and/or response.

Figure 3:
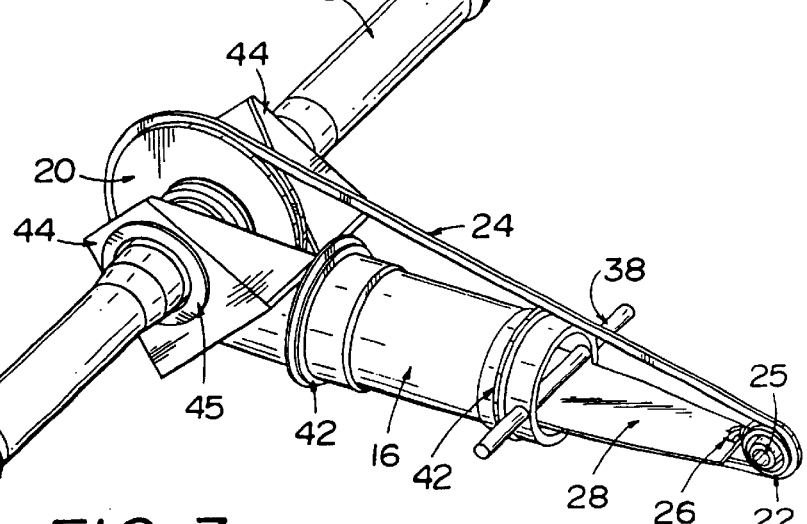
FIG. 3 is a perspective view of the integrated semi-independent suspension and drivetrain system of FIG. 1 but with the swing arm removed.

The general shape and features of the axle carrier 16 is more clearly illustrated in FIG. 3 which shows a perspective view of the integrated semi-independent suspension and drivetrain system 10 with the swing arm 12 removed. Because the swing arm 12 of the present embodiment is substantially tubular in shape, the axle carrier 16 of the present embodiment is also substantially tubular in shape and is dimensioned to be rotatably mounted to the tubular swing arm 12. In this regard, the suspension and drivetrain system 10 includes two bearings 42 mounted between the axle carrier 16 and the swing arm 12 to reduce friction as the axle carrier 16 rotates relative to the swing arm 12. In addition, the axle carrier 16 may include at two axle mounting brackets 44 and axle bearings 45 for mounting and reducing rolling friction of the axle assembly 18. As can also be seen, the driven sprocket 20 is positioned between the two axle mounting brackets 44 in the middle of the axle assembly 18.

As previously noted, the specifics and details of the components are provided as examples only and are not required to practice the present invention. For instance, different number of bearings may be provided instead of the two bearings 42. Moreover, the swing arm 12 and the axle carrier 16 need not be tubular in shape. In such instances, different member geometries and bearing support configurations may be used to provide for the relative member motions of this invention. However, in the present illustrated embodiment, swing arm 12 and axle carrier 16 having a tubular shapes are used since they provided a simple, low mass, robust, and cost effective way of practicing the present invention.

Figure 4:
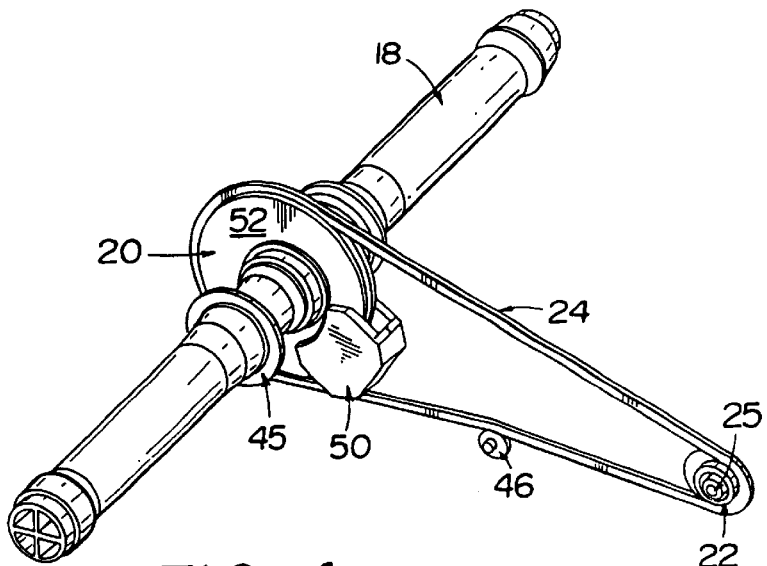
FIG. 4 is a perspective view of the integrated semi-independent suspension and drivetrain system of FIG. 3 but with the axle carrier removed.

FIG. 4 illustrates the integrated semi-independent suspension and drivetrain system 10 of FIG. 3 but with the axle carrier 16 removed. As can be clearly seen, the present illustrated embodiment also includes a tensioner 46 for reducing any slack in the flexible coupling 24. The tensioner 46 is positioned to the axle carrier 16 substantially midway between the driven sprocket 20 and the drive sprocket 22 on the side of the flexible coupling 24 which does not normally bear heavy loads.

Whereas the tensioner 46 is illustrated as being a wheeled device, it should be recognized that other tensioners known in the art may also be used. For instance, the tensioner 46 may be spring loaded wheel or a spring loaded low friction block.

As can also be seen in FIG. 4 and described in greater detail below, the illustrated embodiment of the present invention also includes a brake assembly 50 for exerting a braking force, thereby providing the braking force needed to resist rotational motion of the axle assembly 18 to stop the rear wheels.

The details of the of assembly 18 together with the brake assembly 50 and the driven sprocket 20 are best illustrated in FIGS. 5 and 6 which show assembly views of these components. As can be seen, the brake assembly 50 includes a brake caliper 54 mounted on the axle carrier 16 (not shown) for frictionally engaging the left brake disk 56 disposed on a left side of the driven sprocket 20 and a right brake disk 56' disposed on a right side of the driven sprocket 20. The left brake disk 56 and the right brake disk 56' both include a brake surface 52 which contacts brake pads (not shown) of the brake caliper 54 in a conventional manner to exert a braking force which resists the rotation of the left brake disk 56 and the right brake disk 56'. As can be seen, the suspension and drivetrain system 10 also includes a left axle 70 and a right axle 70'. The left brake disk 56 is rotationally fixed relative to the left axle 70, whereas the right brake disk 56' is rotationally fixed relative to the right axle 70'. The left and right brake disks 56 and 56' as well as the brake caliper 54 may be floating disks and caliper, the specifics of which are known and need not be detailed here. In this regard, the driven sprocket 20 may include a friction material 64 that frictionally engage the inner brake surface of left brake disk 56 and the inner brake surface of the right brake disk 56'. Thus, when pressure to the brake caliper 54 of the brake assembly 50 is applied, the rotational movement of the left brake disk 56 and the right brake disk 56' and driven sprocket 20 are robustly resisted and rotation of the left axle 70 and right axle 70' are thereby resisted. Moreover, to ensure that the brake surface 52 of the left and right brake disks 56 and 56' remains clean and free of any lubrication used (if any) for the flexible coupling 24, the driven sprocket 20 may include an axially extending flange 62 around a periphery of the driven sprocket 20 to act as a physical barrier to such lubricants or other debris which may otherwise diminish braking performance. Further, the friction material doesn't have to be fixed to the sprocket. For example, the friction material could be provided on inner surfaces of the left and right brake disks in a manner that the left and right brake disks frictionally engage the driven sprocket. In another example, the friction material may not be fixed to either the drive sprocket or the right or the left brake disks, but could be provided on a friction disk in an axial clutch-pack manner and be positioned between each of the brake disks and the driven sprocket.

As can also be seen in FIGS. 5 and 6, the axle assembly 18 in accordance with the illustrated embodiment also includes a differential gear system discussed hereinbelow which will allow the left axle 70 to rotate at a different rotational speed compared to the right axle 70' thereby eliminating the disadvantages of the solid axles used in prior art designs. In the illustrated embodiment, the differential gear system includes a plurality of pinion gears 72 (FIG. 5), a sun gear 74 integrally provided at one end of the left axle 70 and a ring gear 76 (FIG. 6) integrally provided at one end of the right axle 70'. These components are assembled in the manner shown in FIGS. 5 and 6 wherein the sun gear 74 is positioned central to the circularly positioned pinion gears 72 so that the pinion gears 72 engage the sun gear 74. The ring gear 76 is positioned on an outer periphery of the circularly positioned pinion gears 72 so that the pinion gears 72 engage the ring gear 76. This positioning of the pinion gears 72 may be attained by providing plurality of one or more pinion constraint member(s) (not shown) at the hub of the driven sprocket 20 to which the pinion gears 72 may be mounted or by simply caging the pinion gears 72 between the sun gear 74 and the ring gear 76 so that the pinion gears 72 freely rotate when there is relative rotation between the sun gear 74 and the ring gear 76. In the present embodiment, bearings 78 may be provided to reduce friction between the relative rotation of the left and right axles 70 and 70' thus providing a compact, strong, low mass integrated differential axle for the suspension and drivetrain system 10. In addition, as can be seen in these figures as well as others, the left axle 70 and the right axle 70' of the present embodiment include interior webbing 80 for substantially increased bending strength while minimizing increases in mass.

It is important to note that when utilizing the above described differential gear system in accordance with the present invention, it is desirable to dimension the sun gear 74 and the ring gear 76 such that their respective diameters are maximized and made to be nearly the same size as much as possible whereas the diameter of the pinion gears 72 is minimized. In this manner, any potential torque steer resulting from the present differential gear system will be negligible and such negative effect is clearly outweighed by the benefits of minimizing the resistive turning moments associated with the usage of a solid rear axle as used in the prior art devices.

The axle assembly 18, together with the brake assembly 50, in accordance with the present embodiment may be assembled in the following manner. The following components being assembled in position about the axle carrier. The left brake disk 56 is mounted to the left axle 70 in a keyed or splined manner so that it is rotationally fixed to the left axle 70. The plurality of pinion gears 72 are installed on the driven sprocket 20 which may include one or more pinion constraint member(s) (not shown) at the hub of the driven sprocket 20 for mounting the plurality of pinion gears 72 or otherwise caged in a circular manner by the driven sprocket hub. Then, the driven sprocket 20 with the circularly mounted plurality of pinion gears 72 are installed on to the left axle 70 so that the plurality of pinion gears 72 engage the sun gear 74 and are positioned around the sun gear 74. The right brake disk 56' is then mounted to the driven sprocket 20 together with the bearings 78. The right axle 70' is then installed on the driven sprocket 20 in a manner that the ring gear 76 engages the plurality of pinion gears 72 and the plurality of pinion gears 72 are positioned within the ring gear 76. In this manner, the left axle 70 and a right axle 70' may be mutually supported in an inter-cantilevered fashion. At the same time, the right brake disk 56' is adjusted so that it slides into a key or spline (not shown) provided on the right axle 70' thereby allowing it to be rotationally fixed to the right axle 70'. The disk brake caliper 54 is then installed onto the axle carrier 16 to enable braking.

It should be recognized that the above discussion illustrates only one embodiment of the brake assembly 50 and the axle assembly 18 and many variations may be possible with respect to these assemblies. For instance, as previously described, the friction material may be provided on a floating friction disks (not shown) in a clutch disk manner or the brake disks may include friction material fixed to inner surfaces of the brake disks (not shown) so that the brake disks frictionally engage the driven sprocket 20. In addition, the left brake disk 56 and the right brake disk 56' may be vented or be eliminated such that the brake surface is provided directly on the driven sprocket 20 itself which may also be vented. This configuration used with a solid axle would be very desirable for high powered racing applications. In addition, the sun gear 74 and the ring gear 76 need not be integrally provided on the left and right axles 70 and 70' but instead, may be separate components which are fixedly attached to the respective axles. In addition, whereas the present embodiment shows axles having interior webbing 80 for increased bending strength, such interior webbing 80 is optional and may be omitted in other axle designs or the axles may even be solid axles.

FIGS. 7 and 8 better illustrate the above described embodiment of the integrated semi-independent suspension and drivetrain system 10 in use and operation. FIG. 7 illustrates how the above described embodiment of the present invention may be mounted and used in a vehicle having four wheels. As can be clearly seen, the integrated semi-independent suspension and drivetrain system 10 is used to drive the rear wheels 2 of the vehicle (not shown), the rear wheels 2 being attached to the left and right axles of the axle assembly 18. The suspension and drivetrain system 10 is mounted to the vehicle frame (mounting points indicated as 1) via the swing mounts 14 which allows the rear wheels 2 to pivot about the transverse axis TA. As was previously explained, rotational power is transferred from the drive sprocket 22 to the driven sprocket 20 which rotates the left axle 70 and the right axle 70', which in turn, rotate the wheels 2. When the vehicle is going in straight or forward only motion, the speed of rotation of the wheels 2 and the corresponding axles are the same. In such operation, there is no relative movement in the differential system as the either axle embodiment is rotated by the driven sprocket 20. As the vehicle negotiates a turn, the left and right axles are allowed to rotate at different speeds as the sun gear 74 and the ring gear 76, both of which engage the plurality of pinion gears 72, are permitted to rotate relative to one another.

When the vehicle's body rolls or the wheels 2 go over uneven surfaces, the axle assembly 18 rolls about the suspension roll axis SRA as shown in FIG. 8. As discussed previously, this is attained in the present embodiment by providing an axle carrier 16 which is rotatably mounted to the swing arm 12. FIG. 8 also clearly illustrates the drive sprocket 22 with a CV joint which is kept in alignment with the driven sprocket 20 as the axle assembly 18 rolls about the suspension roll axis SRA. Furthermore, FIG. 8 also shows how the stabilizer bar 38 establishes a mechanical linkage between the axle carrier 16 and the swing arm 12 in a manner to resist rotation of the axle carrier 16 relative to the swing arm 12 and urges the axle carrier 16 to return to the unrotated position initially illustrated in FIG. 1.

In the above described manner, the illustrated integrated semi-independent suspension and drivetrain system 10 provides superior handling performance, extensive range of travel, eliminates the limitations caused by use of a solid rear axle, minimizes the unsprung mass, allows the use of a chain drivetrain, and also allows provisions for a disk brake system in a simple, compact, robust, and cost effective system.

Figure 10:
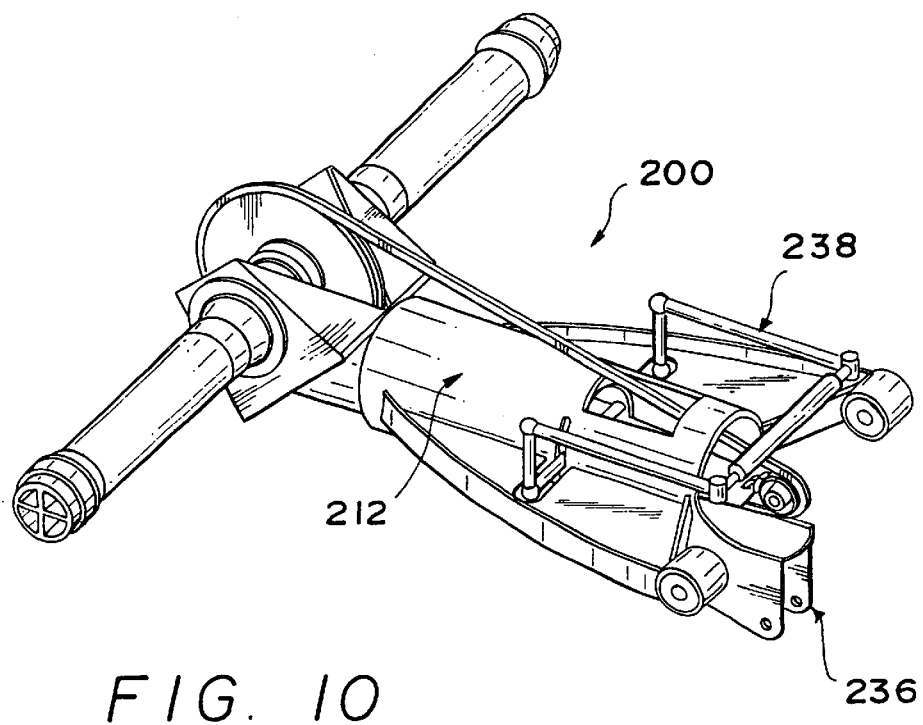
FIG. 10 is a perspective view an integrated semi-independent suspension and drivetrain system in accordance with another embodiment of the present invention.
Figure 11:
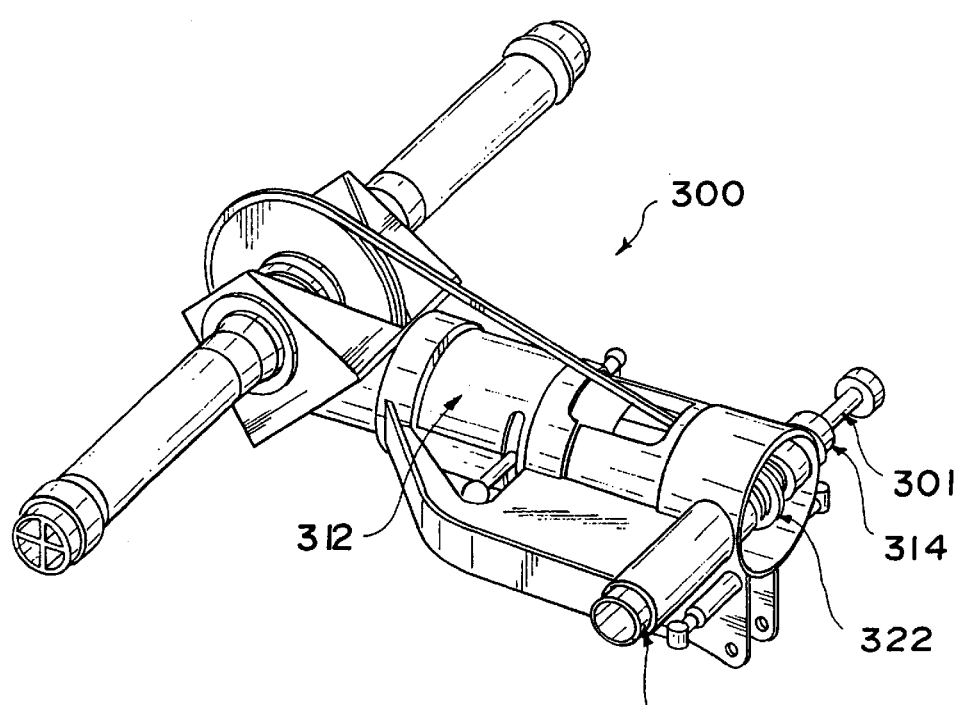
FIG. 11 is a perspective view of an integrated semi-independent suspension and drivetrain system in accordance with yet another embodiment of the present invention.

It should be noted that the above noted embodiment of the present invention may be further modified and used in a different manner. For instance, FIG. 9 illustrates an alternative application where the integrated semi-independent suspension and drivetrain 100 is essentially an inverted embodiment mounted in an inverted orientation to the embodiment of FIG. 1. As can be seen by the common enumeration, the suspension and drivetrain 100 have the same components but is mounted in an inverted orientation so that additional ground clearance may be attained. FIG. 10 illustrates a slightly modified embodiment of the embodiment shown in FIG. 1 in that the stabilizer bar 238 may be provided extending away from the swing arm 212 so as to allow mounting of the stabilizer bar 238 elsewhere on the vehicle, such as the vehicle frame, instead of by the shock mount 236. Yet another modified embodiment of the integrated semi-independent suspension and drivetrain 300 is illustrated in FIG. 11. In this embodiment, two swing mounts 314 are provided for mounting the swing arm 312 and a drive shaft 301 is attached to the drive sprocket 322 to provide rotational power thereto. This embodiment is particularly useful in applications where the vehicle transmission output (not shown) is not located on the transverse axis TA and along the vehicle centerline, since the drive shaft 301 provides an effective way for transferring the rotational power to the drive sprocket 322.

Figure 12:
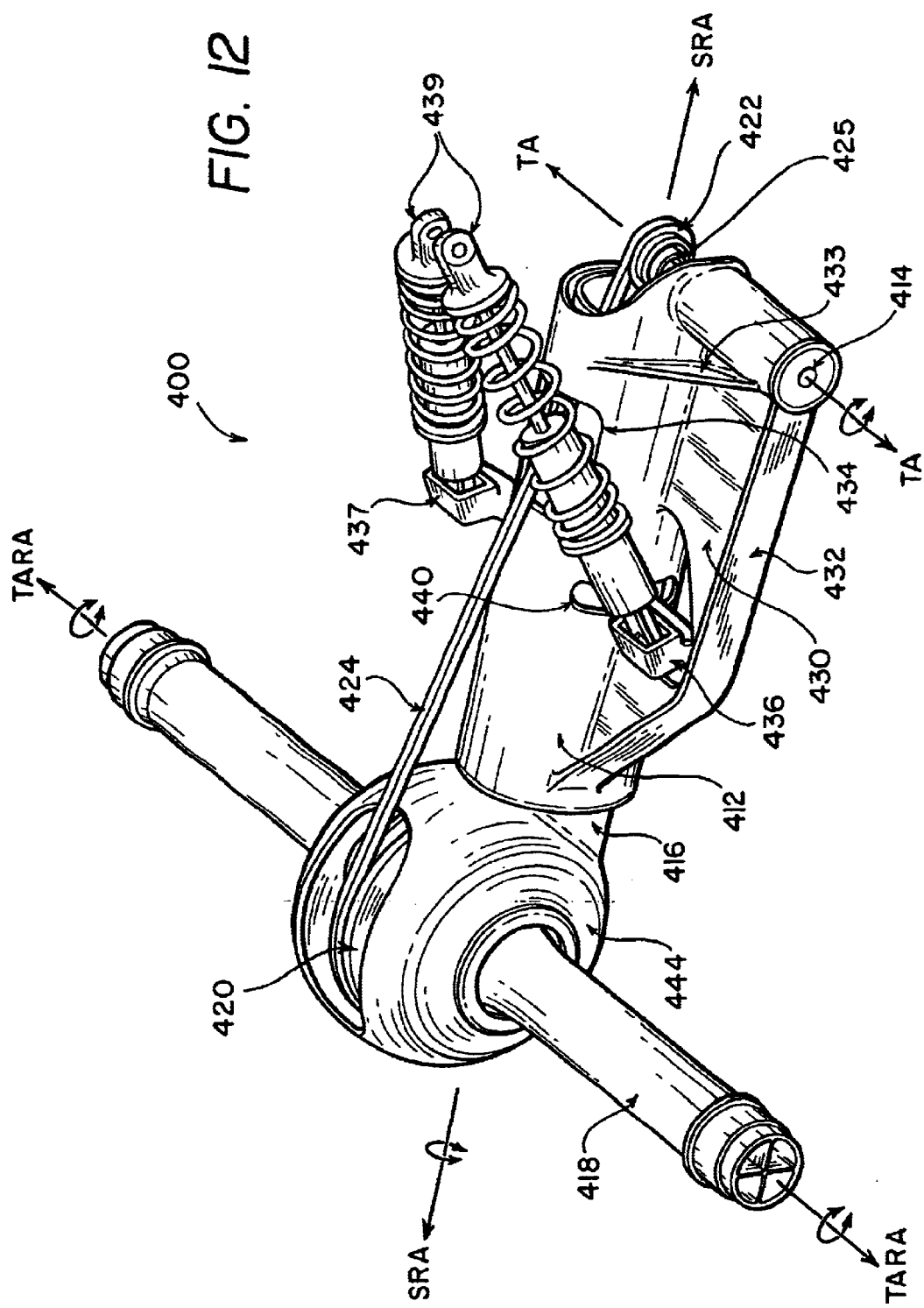
FIG. 12 is a perspective view of an integrated semi-independent suspension and drivetrain system in accordance with yet another embodiment of the present invention.
Figure 13:
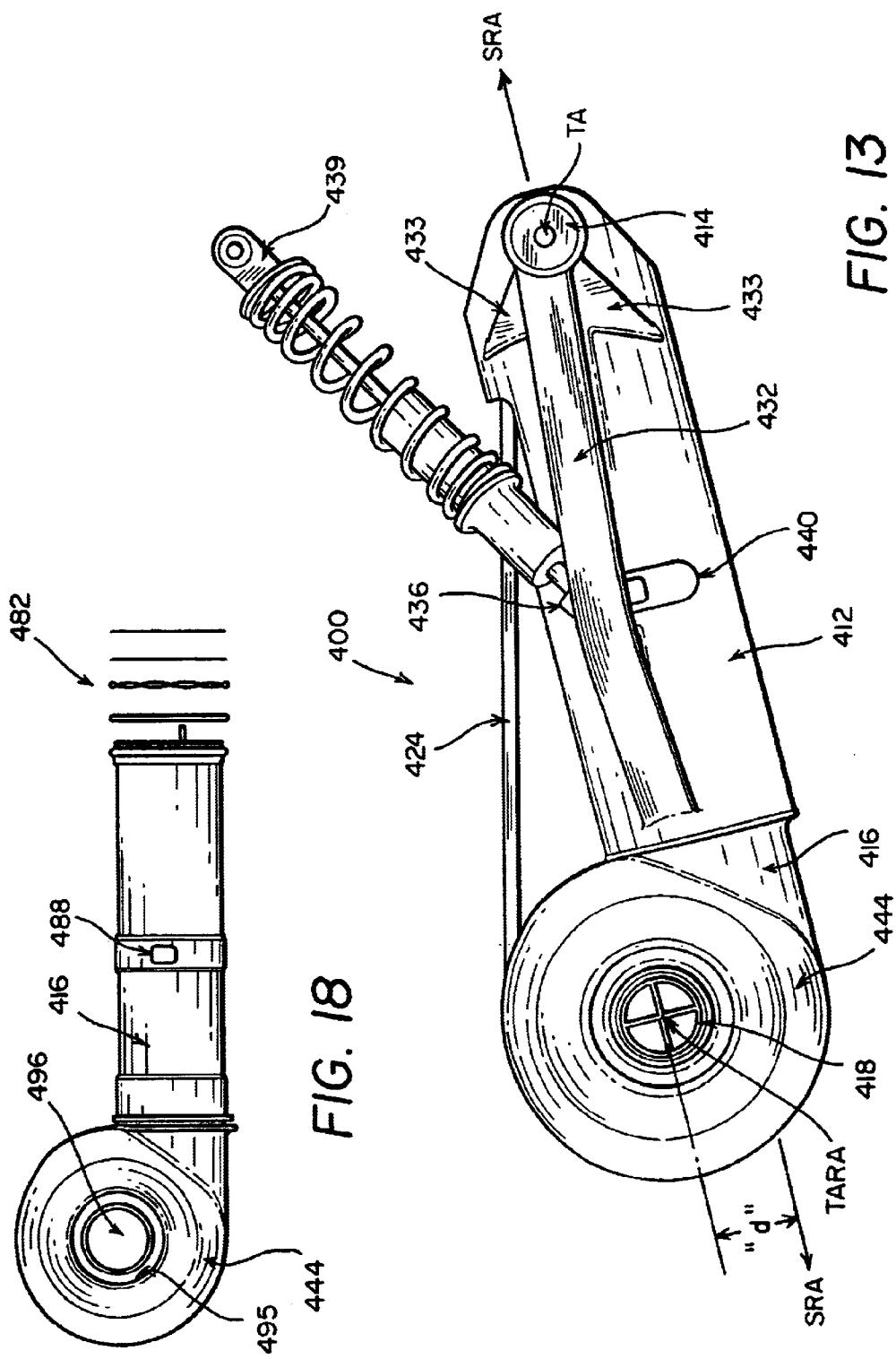
FIG. 13 is a side perspective view of the integrated semi-independent suspension and drivetrain system of FIG. 12.

FIGS. 12 and 13 show another embodiment of the integrated semi-independent suspension and drivetrain 400 in accordance with the present invention. Like the above described embodiments, the integrated semi-independent suspension and drivetrain 400 includes a swing arm 412 with a swing mount 414 which pivotally mount the swing arm 412 to a vehicle (not shown) to allow the suspension and drivetrain 400 to pivot about the transverse axis TA. The suspension and drivetrain 400 also includes an axle carrier 416 for mounting an axle assembly 418, the axle carrier 416 being rotatably mounted to the swing arm 412 to allow the axle assembly 418 to roll about a suspension roll axis SRA. As can be seen, the illustrated embodiments of the swing arm 412 and the axle carrier 416 are substantially tubular in shape and the axle carrier 416 is dimensioned to be rotatably mounted to the swing arm 412 as previously described. In addition, the axle assembly 418 is adapted to rotate relative to the axle carrier 416 along the transverse axle rotation axis TARA as shown in FIG. 12 to drive the wheels (not shown) that are connected to the axle assembly 418.

As can be also seen, the suspension and drivetrain 400 includes a driven sprocket 420 substantially centrally attached to the axle assembly 418 for rotating the axle assembly 418, and a drive sprocket 422 for transferring rotational power to the driven sprocket 420. This transference of rotational power is obtained in the illustrated embodiment via a flexible coupling 424 which mechanically links the driven sprocket 420 to the drive sprocket 422. Like the previously described embodiments, the flexible coupling 424 is a flexible chain coupling. However, in other embodiments, a drive belt or other flexible coupling which is appropriate for transferring rotational power may also be used. As previously noted, in such an embodiment utilizing a drive belt, the driven sprocket 420 and drive sprocket 422 would actually be pulleys which engage the drive belt. Thus, whereas the specific embodiment described herein and shown in the drawings utilize conventional flexible chain coupling with a driven sprocket 420 and drive sprocket 422, other flexible couplings may also be used in practicing the present invention in other embodiments and the terms driven sprocket 420 and the drive sprocket 422 should be understood and is used in the general sense to include such alternatives as pulleys.

In the present illustrated embodiment utilizing a conventional flexible chain coupling, the axle carrier 416 is rotatably mounted to the swing arm 412, thus allowing the axle assembly 418 to roll about a suspension roll axis (SRA). To allow the flexible coupling 424, which may require planar orientation, to maintain the mechanical link between the driven sprocket 420 and the drive sprocket 422, a roll movement means such as a constant velocity (a.k.a. CV) joint 425 may be provided. In this regard, it should also be noted that in other embodiments, the movable joint may be a universal joint (U-Joint), and/or a curvic spline joint (CSJ) instead of the CV joint 425 shown. In addition, the integrated semi-independent suspension and drivetrain system 400 also includes a peripheral opening 434 on a peripheral surface of the swing arm 412 to allow at least a segment of the flexible coupling 424 extending between the driven sprocket 422 and the drive sprocket 420 to be outside of the swing arm 412. In this regard, the peripheral opening 434 may preferably be dimensioned in a manner that a clearance space exists between the flexible coupling 424 and the peripheral opening 434 throughout a range of motion of the flexible coupling 424, the range of motion being defined by rotation of the axle carrier 416 along the suspension roll axis SRA and alignment of the drive sprocket 422 with the driven sprocket 420.

As also illustrated in FIGS. 12 and 13, the integrated semi-independent suspension and drivetrain system 400 of the present embodiment includes one swing mount 414 which is attached to the swing arm 412 by lateral reinforcement rib 430 which also include perpendicular reinforcement ribs 432, as well as a laterally inclined reinforcement rib 433. These lateral reinforcement ribs provide added structural rigidity to the suspension and drivetrain system 410, especially for the swing mount 414. Of course, in other embodiments, additional swing mounts may also be provided in a manner shown in the embodiment of FIG. 1 or in any other appropriate manner as well.

Again, the swing arm 412 of the present embodiment is substantially tubular in shape and includes a peripheral opening 434 to allow at least a segment of the flexible coupling 424 to extend outside of the swing arm 412. The peripheral opening 434 should be properly dimensioned in a manner that a clearance space exists between the flexible coupling 424 and the peripheral opening 434 throughout a range of motion of the flexible coupling 424, the range of motion being defined by rotation of the axle carrier 416 and alignment of the drive sprocket 422 with the driven sprocket 420. Thus, the peripheral opening 434 should be dimensioned correspondingly so that interfering contact between the flexible coupling 424 and the swing arm 412 would not occur.

In addition, as can also be seen in FIGS. 12 and 13 that the illustrated embodiment of the integrated semi-independent suspension and drivetrain system 400 includes two shock mounts 436 and 437, each for mounting a shock absorber/spring assemblies 439. In the present embodiment, the two shock mounts 436 and 437 are positioned along and mounted to the sides of the axle carrier 416 through the peripheral slots 440 (only one being shown in this view). As can be seen, the two shock mounts 436 and 437 flank the suspension roll axis SRA on two sides at a spaced distance away from the suspension roll axis SRA so that when the axle carrier 416 is rotated along the suspension roll axis SRA, the two shock mounts 436 and 437 are correspondingly displaced. In this regard, the peripheral slots 440 are large enough to allow displacement of the shock mounts 440 as the axle carrier 416 rotates along the suspension roll axis SRA so that such rotation is resisted and dampened by the shock absorber/spring assemblies 439. In addition, the springs of the shock absorber/spring assemblies 439 act to center the axle carrier 416 so as to automatically return the axle carrier 416 to the centered position shown. Of course, it should be noted that in other embodiments, the shock mounts 436 and 437 may be used to mount only one of a shock or a spring instead of the combination shock absorber/spring assemblies as shown. In addition, in other embodiments of the present invention, differently positioned shock mounts may also be provided in addition to, or in lieu of, the shock mounts shown.

Referring to FIG. 13, the illustrated embodiment of the integrated semi-independent suspension and drivetrain system 400 further includes a provision that acts to enhance the automatic return of the axle carrier 416 to the centered position shown. More specifically, the transverse axle rotation axis TARA of the axle assembly 418 (which in FIG. 13 comes out of the page) is elevated above the suspension roll axis SRA by a predetermined offset distance "d" in the manner shown. This offset distance "d" effectively increases the centering torque applied to the axle carrier 416 by the weight of the vehicle in which the suspension and drivetrain system 400 is used as well as the weight of the operator. This provision further acts to improve stability to a vehicle utilizing the integrated semi-independent suspension and drivetrain system 400 in a similar manner as well. It should be noted that of course, in other embodiments, this feature may be omitted and the transverse axle rotation axis TARA of the axle assembly 418 may be at the same level or even below the suspension roll axis SRA, such an embodiment being shown in FIG. 9.

Figure 14:
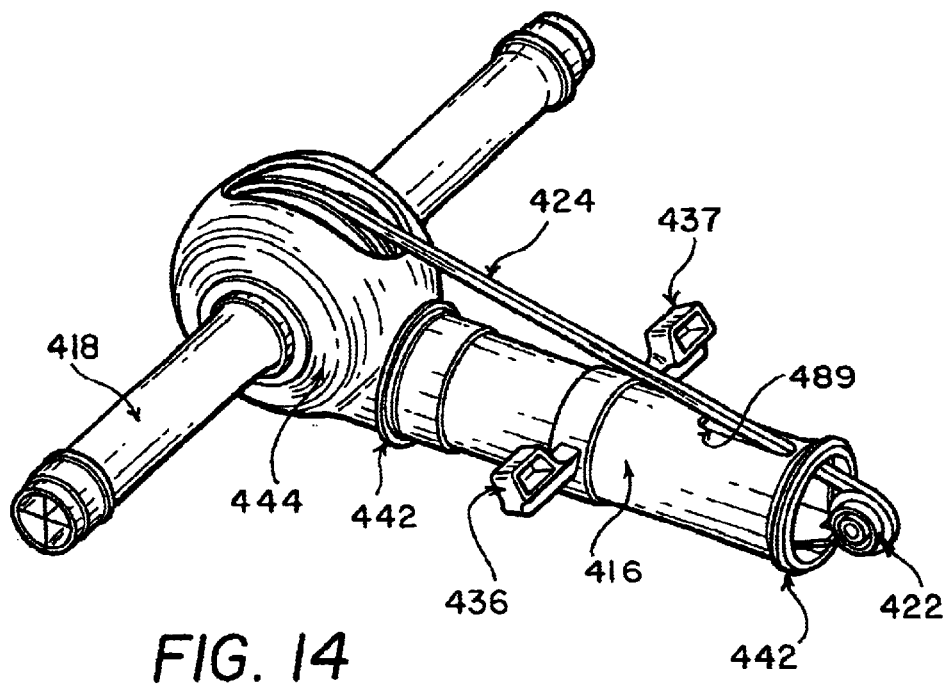
FIG. 14 is a perspective view of the integrated semi-independent suspension and drivetrain system of FIG. 12 but with the swing arm removed.

FIG. 14 is a perspective view of the integrated semi-independent suspension and drivetrain system 400 of FIG. 12 but with the swing arm 412 removed. As can be clearly seen, the two shock mounts 436 and 437 are mounted to the axle carrier 416 so that the two shock mounts 436 and 437 are displaced axle carrier 416 rotates along the suspension roll axis SRA.

Figure 15:
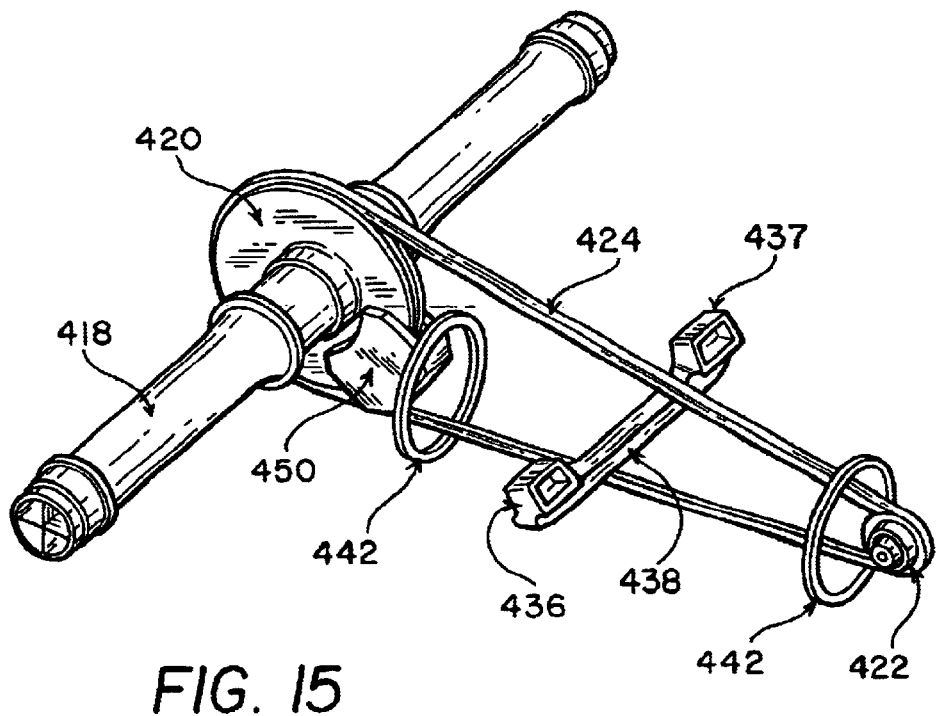
FIG. 15 is a perspective view of the integrated semi-independent suspension and drivetrain system of FIG. 14 but with the axle carrier removed.

FIG. 15 is also a perspective view of the integrated semi-independent suspension and drivetrain system 400 of FIG. 14 but with the axle carrier 416 removed to thereby more clearly show the axle assembly 418 and the driven sprocket 420. As can be seen, the two shock mounts 436 and 437 are connected together in the present embodiment by connector 438 which extends through the axle carrier 416 to mount the two shock mounts 436 and 437 to the axle carrier 416. Of course, in other embodiments, the two shock mounts 436 and may be directly attached to the sides of the axle carrier 416 instead. A brake assembly 450 is also illustrated in FIG. 15 which may be similar to the assembly discussed previously relative to FIGS. 5 and 6. However, the brake assembly 450 may also be provided with an additional feature as described below relative to FIGS. 19A and 19B.

FIGS. 14 and 15 also show two bearings 442 which are mounted between the axle carrier 416 and the swing arm 412 to reduce friction as the axle carrier 416 rotates relative to the swing arm 412. In addition, as can also be appreciated, instead of the axle mounting brackets as provided in the previous embodiments, the axle carrier 416 of the present embodiment includes an axle mounting housing 444 in which the driven sprocket 420 is housed.

FIG. 16 is an exploded assembly view of the axle carrier 416 in accordance with a preferred embodiment including an extensible adjustment mechanism and a bearing preload adjuster which are described in further detail herein below. In the illustrated embodiment, the integrated semi-independent suspension and drivetrain system includes an extensible adjustment mechanism in the form of an adjustable axle carrier-to-swing arm bearing constraint 482 which is adapted allow adjustment of axial position and preload of the axle carrier 416 relative to the swing arm 412 shown in FIG. 12. In this regard, bearing constraint 482 may be positioned on the axle carrier 416 and/or the swing arm 412. The bearing constraint 482 of the illustrated embodiment includes a preloading wave ring 484, a shim ring 485, a retaining ring 486. In the present embodiment, a bearing adapter ring 443 is also provided to interface with one of the two bearing 442. By adjusting various parameters such as thickness and strength of the wave ring 484 and/or the shim rim 485, the axial position and preload of the axle carrier 416 relative to the swing arm 412 can be readily controlled.

As can also be seen in FIG. 16, the axle carrier 416 in accordance with the illustrated example also includes axle bearings 445 for supporting and reducing rolling friction of the axle assembly 418. Furthermore, the axle carrier 416 shown also includes a bearing preload adjuster adapted to allow adjustment of relative axle bearing preload between the axle assembly 418 and the axle carrier 416. In this regard, the bearing preload adjuster includes an adjustable axle bearing constraint 490 having a bearing constraint 491, a preloading wave ring 492 and a retaining ring 493. The adjustable axle bearing constraint may be provided on the axle carrier 416 in the manner shown or alternatively, be provided on the axle assembly 418 itself. Of course, it should also be noted that in other embodiments, a shim ring may also be provided like the bearing constraint 482 described above.

FIG. 16 also clearly shows opening 488 extending through the axle carrier 416 for receiving the connector 438 which connects and mounts the shock mounts 436 and 437 to the axle carrier 416 in the manner shown in FIGS. 14 and 15. Furthermore, opening 489 is also provided in the axle carrier 416 to allow at least a portion of the flexible coupling 424 to extend out of the axle carrier 416.

FIG. 17 is an enlarged view of the end of the axle carrier 416 which clearly illustrates the drive sprocket 422 which drives the driven sprocket 420 through the flexible coupling 424. As can be seen, in this embodiment, the CV joint 425 is centrally disposed on the drive sprocket 422 to allow maintenance of planar alignment of the drive sprocket 422 relative to the driven sprocket 420 as the driven sprocket 420 rolls about the suspension roll axis SRA. In this regard, the present embodiment also includes a guide 426 that facilitates maintenance of planar alignment of the drive sprocket 422 with the driven sprocket 420. In this regard, the guide 426 is provided on a guide mount 428 which extends from the axle carrier 416 to the drive sprocket 422. The guide 425 in the illustrated embodiment is a cutaway as shown which is provided on an edge of the guide mount 428. In other embodiments however, the guide may include a thrust bearing and/or a roller mounted on the guide mount 428. Of course, as previously noted, it should also be recognized that in certain embodiments, the CV joint 425 and/or guide 426 may not even be necessary in order to allow the axle carrier 416 to roll about the suspension roll axis SRA, such as when a drive belt is used as the flexible coupling 424.

Moreover, the embodiment of FIG. 17 also illustrates an internal reinforcement web 429 which may extend a substantial portion of the axle carrier 416 to thereby increase strength and rigidity of the axle carrier 416. Of course, in an alternative embodiment where the swing arm 412 is supported in the axle carrier 416, the reinforcement web may be provided in the swing arm instead.

FIG. 18 is a side perspective view of an axle carrier in accordance with another embodiment of the present invention including a rotatable adjustment mechanism where the bearing constraint is an a eccentric bearing constraint 495. More specifically, the eccentric bearing constraint 495 is provided with an eccentric opening 496 which is off-centered so that the radial position of the axle assembly 418 which is received in the eccentric opening 496 may be readily adjusted by rotating the eccentric bearing constraint 495. Such adjustability allows precise positioning of the axle assembly 418 and also allows the tension of the flexible coupling 424 to be adjusted if a separate tensioner such as that shown in FIG. 4 is not provided.

Figure 19B:
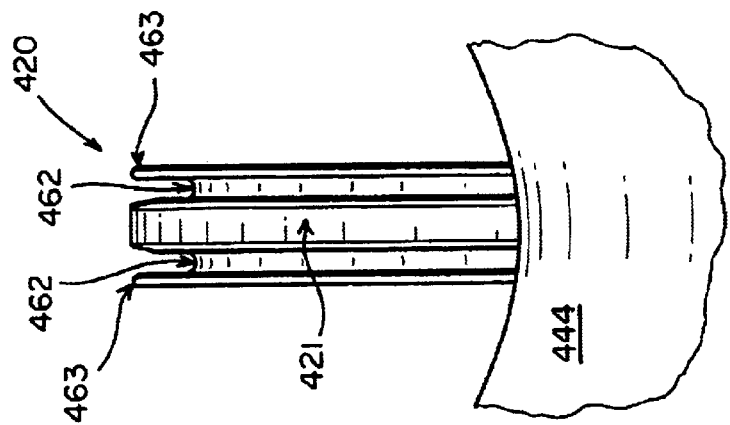
FIG. 19B is a frontal view of the driven sprocket of FIG. 19A.
Figure 19A:
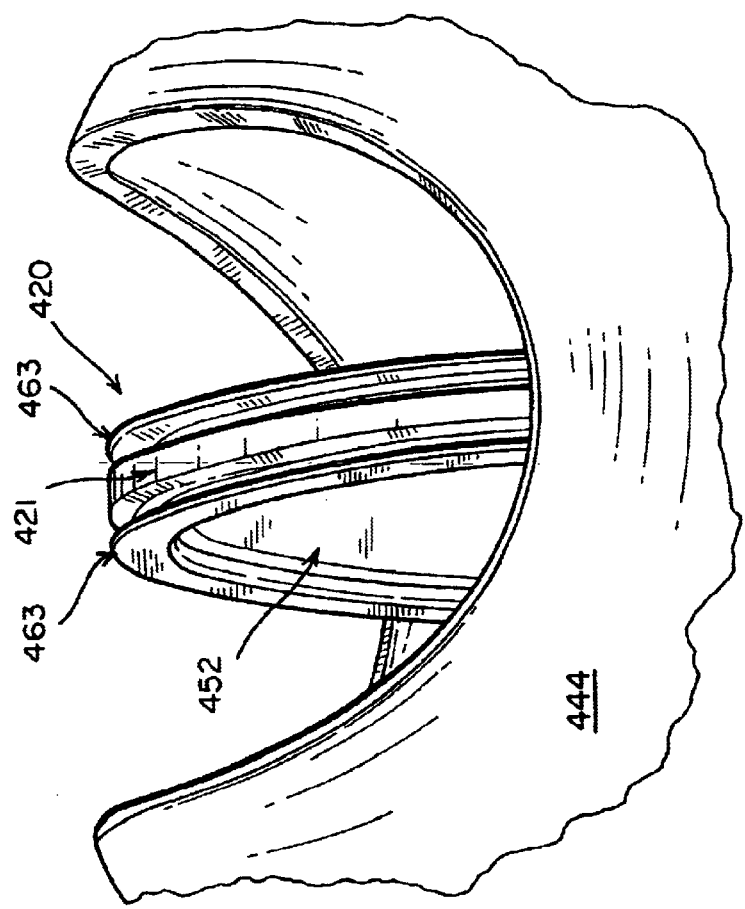
FIG. 19A is an enlarged perspective view of the driven sprocket having a brake disk in accordance with one embodiment of the present invention.

FIG. 19A illustrates the driven sprocket 420 having a brake surface 456 (only one shown) thereon in accordance with one embodiment of the present invention. The various operational details of the brake assembly 450 which is adapted to exert a braking force on the driven sprocket 420 via the brake surface 452 to resist rotation of the driven sprocket 420 has already been discussed previously and thus, such details are omitted to avoid repetition. However, as can be most clearly seen in FIG. 19B, the driven sprocket 420 in accordance with the illustrated embodiment includes axially extending flanges 462, radial dimension of the axially extending flanges 462 (as measured from the center of the driven sprocket 420) being smaller than a radial dimension of a plurality of teeth (schematically illustrated as 421) on the driven sprocket 420. Thus, in the illustrated portion of the driven sprocket 420, the axially extending flanges 462 are below the teeth of the driven sprocket 420.

In addition, as also can be most clearly seen in FIG. 19B, the driven sprocket 420 in accordance with the illustrated embodiment also includes radially extending flanges 463 which are adjacent to the plurality of teeth 421. In such an embodiment, the radial dimension of the radially extending flanges 463 is at least equal to a radial dimension of a plurality of teeth on the driven sprocket 421. The above described axially extending flanges 462 and radially extending flanges 463 thus aid in reducing any oil, dirt or other contaminants from the flexible coupling 424 from being displaced on to the brake surface 452.

Of course, the above noted axially extending flanges 462 and radially extending flanges 463 may be provided on separate brake disks as shown and discussed above relative to FIGS. 5 and 6. Thus, these flanges may be provided on a left brake disk disposed on a left side of the driven sprocket and a right brake disk disposed on a right side of the driven sprocket. These brake disks may also be floating disks and the caliper be a floating caliper. These features have already been described in detail previously and thus, omitted here to avoid repetition.

It should also be noted that the illustrated embodiment of FIGS. 12 and 13, the axle assembly 418 is also preferably provided with a left axle and a right axle and the driven sprocket includes a differential gear system in a manner shown and discussed relative to FIGS. 5 and 6 that allows the left axle to rotate at a different rotational speed compared to the right axle. In this regard, the differential gear system preferably comprises a plurality of pinion gears 76 that rotate on axes that remain parallel to the transverse axle rotation axis TARA. At least one of the left axle and the right axle includes a sun gear 74 at one end for engaging the plurality of pinion gears 76 and the other axle includes a ring gear 76 at one end for engaging the plurality of pinion gears 76. As can be seen in the assembly view of FIG. 6, axle assembly 418 with the differential is arranged such that the left axle 70 is centrally eclipsed and supported by the right axle 70' in a mutually supportive load path to the axle carrier. Further details of the differential gear system is omitted to avoid repetition.

Again, it is noted that the illustrated embodiments described above are examples of the present invention only. In addition, while not shown, the embodiment of FIGS. 12 and 13 may further including a stabilizer bar (not shown) for establishing a mechanical linkage between the axle carrier and at least one of the swing arm and the vehicle in a manner to resist roll rotation of the axle carrier relative to at least one of the swing arm and the vehicle. A damper to dampen rotation of the axle carrier relative to the swing arm may also be provided.

From the foregoing, it should now be apparent how the present invention provides an improved semi-independent suspension and drivetrain for vehicles which allows superior handling performance by allowing the axle to pivot about a vehicle's longitudinally oriented roll axis as well as the transverse axis TA. It can also be seen how the present invention provides for such a suspension design which allows extensive travel and eliminates the limitations caused in utilizing a solid axle. In addition, it can also be seen how the present invention provides a suspension and drivetrain which minimizes the unsprung mass of the vehicle, allows the use of a flexible chain coupling or other flexible coupling drivetrain and allows provisions for a disk brake system. Furthermore, it can be seen how the present invention provides such a suspension and drivetrain which is simple, compact, robust, and cost effective.

Further in this regard, various materials or combinations thereof can be used in the manufacturing of the suspension and drivetrain system in accordance with the present invention. For instance, for higher performance ATV racing applications, various low density, high strength metal alloys such as the newer metal matrix composites and or the more standard aluminum alloys could be used for numerous components including the swing arm, axle carrier, axle assembly, brake assembly and the driven and drive sprockets to name a few. Obviously, other nonmetallic materials may also be used for these performance applications, including composites such as carbon fiber or kevlar. Further, recreational and utility ATVs could utilize basic tubular extrusions and plate or a combination of machined castings or stampings.

While various embodiments in accordance with the present invention have been shown and described, it is understood that the invention is not limited thereto. As noted previously, the various features of the present invention may be selectively used depending on the specific application. For instance, each of the features of the present invention may be used separately depending on the application. Thus, a driven sprocket having a brake surface may be used by itself in certain applications while it may be used with the differential axle and other features of the present invention in other applications. Likewise, the differential axle may be used by itself or with other features of the present invention such as the axle carrier and/or the driven sprocket with a brake surface in other applications. It can be appreciated that many of these features, including the differential axle and the driven sprocket with a brake surface, may also be used in non-semi-independent suspensions. In addition, the driven sprocket with a brake surface may also be used in fully independent suspension designs. Furthermore, these embodiments may be changed, modified and further applied by those skilled in the art. Therefore, it should be clear that this invention is not limited to the details shown and described previously but also includes all such changes and modifications which are encompassed by the appended claims.

Industrial Applicability

The present invention will find applicability in a wide range of vehicles including on and off road vehicles which will benefit from having a semi-independent suspension and drivetrain which is simple, compact, robust, and cost effective.

What is claimed is:

1. An integrated semi-independent suspension and drivetrain system for a vehicle comprising:
    a swing arm with a swing mount for pivotally mounting said swing arm to the vehicle;
    an axle assembly rotatable along a transverse axle rotation axis;
    an axle carrier for mounting said axle assembly, said axle carrier being rotatably mounted to said swing arm to allow said axle assembly to roll about a suspension roll axis;
    a driven sprocket substantially centrally attached to said axle assembly for rotating said axle assembly;
    a drive sprocket for transferring rotational power to said driven sprocket;
    a flexible coupling mechanically linking said driven sprocket to said drive sprocket to allow transfer of rotational power from said drive sprocket to said driven sprocket;
    a roll movement means for allowing said flexible coupling to maintain the mechanical link between said driven sprocket and said drive sprocket as said driven sprocket rolls about the suspension roll axis with said axle carrier; and
    at least two shock mounts, each for mounting at least one of a shock absorber and a spring, said at least two shock mounts being positioned along sides of said axle carrier flanking said suspension roll axis on at least two sides at a spaced distance away from said suspension roll axis.

2. An integrated semi-independent suspension and drivetrain system of claim 1, wherein said swing arm and said axle carrier are substantially tubular in shape and said axle carrier is dimensioned to be rotatably mounted to said swing arm.

3. An integrated semi-independent suspension and drivetrain system of claim 2, further comprising at least one bearing mounted between said axle carrier and said swing arm to reduce friction between said axle carrier and said swing arm.

4. An integrated semi-independent suspension and drivetrain system of claim 1, wherein said swing arm includes one swing mount which is attached to said swing arm by at least one of a lateral reinforcement rib and a laterally inclined reinforcement rib.

5. An integrated semi-independent suspension and drivetrain system of claim 4, wherein at least one of said lateral reinforcement rib and said laterally inclined reinforcement rib includes a perpendicularly oriented reinforcement rib.

6. An integrated semi-independent suspension and drivetrain system of claim 1, wherein at least one of said axle carrier and said swing arm includes an internal reinforcement web extending substantially therethrough.

7. An integrated semi-independent suspension and drivetrain system of claim 6, wherein said axle carrier includes an internal reinforcement web extending substantially therethrough.

8. An integrated semi-independent suspension and drivetrain system of claim 1, further including an extensible adjustment mechanism adapted allow adjustment of axial position and preload of said axle carrier relative to said swing arm.

9. An integrated semi-independent suspension and drivetrain system of claim 8, wherein said adjustment mechanism includes an adjustable axle carrier-to-swing arm bearing constraint on at least one of said axle carrier and said swing arm.

10. An integrated semi-independent suspension and drivetrain system of claim 9, wherein said bearing constraint mechanism includes at least one of preloading wave ring, a retaining ring, a shim ring, and a bearing adapter ring.

11. An integrated semi-independent suspension and drivetrain system of claim 1, wherein said axle carrier includes a rotatable adjustment mechanism to allow adjustment of radial position of said axle assembly relative to said axle carrier.

12. An integrated semi-independent suspension and drivetrain system of claim 11, wherein said rotatable adjustment mechanism includes at least one eccentric bearing constraint.

13. An integrated semi-independent suspension and drivetrain system of claim 1, wherein said flexible coupling is at least one of a drive chain and a flexible belt.

14. An integrated semi-independent suspension and drivetrain system of claim 1, wherein said axle carrier includes a tensioner for reducing slack in said flexible coupling.

15. An integrated semi-independent suspension and drivetrain system of claim 14, wherein said tensioner engages a lower portion of said flexible coupling.

16. An integrated semi-independent suspension and drivetrain system of claim 1, wherein said roll movement means includes a movable joint centrally disposed on said drive sprocket to allow alignment of said drive sprocket relative to said driven sprocket.

17. An integrated semi-independent suspension and drivetrain system of claim 16, wherein said movable joint is at least one of a constant velocity (CV) joint, a universal joint (U-Joint), and a curvic spline joint (CSJ).

18. An integrated semi-independent suspension and drivetrain system of claim 17, wherein said movable joint is a constant velocity (CV) joint.

19. An integrated semi-independent suspension and drivetrain system of claim 16, further including a guide adapted to align said drive sprocket with said driven sprocket, said guide being provided on a guide mount which extends from said axle carrier to said drive sprocket.

20. An integrated semi-independent suspension and drivetrain system of claim 19, wherein said guide for aligning said drive sprocket with said driven sprocket is a cutaway provided on an edge of said guide mount.

21. An integrated semi-independent suspension and drivetrain system of claim 19, wherein said guide for aligning said drive sprocket with said driven sprocket includes at least one of a thrust bearing and a roller mounted on said guide mount.

22. An integrated semi-independent suspension and drivetrain system of claim 21, wherein said guide includes a first roller being mounted on said guide mount in a manner to contact a first surface of the drive sprocket and a second roller being mounted on said guide mount in a manner to contact a second surface of the drive sprocket.

23. An integrated semi-independent suspension and drivetrain system of claim 1, further including an axle bearing that supports said axle assembly and a bearing preload adjuster adapted to allow adjustment of relative axle bearing preload between said axle assembly and said axle carrier.

24. An integrated semi-independent suspension and drivetrain system of claim 23, wherein said bearing preload adjuster includes an adjustable axle bearing constraint on at least one of a left axle, a right axle, and said axle carrier.

25. An integrated semi-independent suspension and drivetrain system of claim 24, wherein said adjustable axle bearing constraint includes at least one of an eccentric bearing constraint, a preloading wave ring, a shim ring, and a retaining ring.

26. An integrated semi-independent suspension and drivetrain system of claim 1, wherein said axle assembly includes a left axle and a right axle and said driven sprocket includes a differential gear system to allow said left axle to rotate at a different rotational speed compared to said right axle.

27. An integrated semi-independent suspension and drivetrain system of claim 26, wherein said differential gear system comprises a plurality of pinion gears, at least one of said left axle and said right axle includes a sun gear at one end for engaging said plurality of pinion gears and at least one of said left axle and said right axle includes a ring gear at one end for engaging said plurality of pinion gears.

28. An integrated semi-independent suspension and drivetrain system of claim 27, wherein said driven sprocket includes at least one pinion constraint member at a hub of said driven sprocket for retaining said pinion gears.

29. An integrated semi-independent suspension and drivetrain system of claim 27, wherein said pinion gears are caged between said sun gear and said ring gear.

30. An integrated semi-independent suspension and drivetrain system of claim 27, wherein said pinion gears rotate on axes that remain parallel to said transverse axle rotation axis.

31. An integrated semi-independent suspension and drivetrain system of claim 26, wherein said left axle and said right axle are supported relative to one another in an inter-cantilevered manner.

32. An integrated semi-independent suspension and drivetrain system of claim 31, wherein a portion of one of said left axle and said right axle is received in, and mutually supported by other of said left axle and said right axle, further including at least one bearing therein between.

33. An integrated semi-independent suspension and drivetrain system of claim 1, further including an axle bearing that supports said axle assembly and a bearing preload adjuster adapted to allow adjustment of relative axle bearing preload between said axle assembly and said axle carrier.

34. An integrated semi-independent suspension and drivetrain system of claim 33, wherein said bearing preload adjuster includes an adjustable axle bearing constraint on at least one of said left axle, said right axle, and said axle carrier.

35. An integrated semi-independent suspension and drivetrain system of claim 34, wherein said adjustable axle bearing constraint includes at least one of an eccentric bearing constraint, a preloading wave ring, a shim ring, and a retaining ring.

36. An integrated semi-independent suspension and drivetrain system of claim 1, further comprising a brake assembly for exerting a braking force on said driven sprocket to resist rotation of said driven sprocket.

37. An integrated semi-independent suspension and drivetrain system of claim 36, wherein said driven sprocket includes a brake surface, and said brake assembly includes a brake caliper with brake pads for frictionally engaging said brake surface of said driven sprocket.

38. An integrated semi-independent suspension and drivetrain system of claim 37, wherein said brake caliper is mounted on said axle carrier.

39. An integrated semi-independent suspension and drivetrain system of claim 37, wherein said brake caliper is a floating brake caliper.

40. An integrated semi-independent suspension and drivetrain system of claim 37, wherein said driven sprocket includes at least one of an axially extending flanges and radially extending flanges adjacent to said flexible coupling around a periphery of said driven sprocket.

41. An integrated semi-independent suspension and drivetrain system of claim 40, wherein said driven sprocket includes an axially extending flange, a radial dimension of said axially extending flange being smaller than a radial dimension of a plurality of teeth on said driven sprocket.

42. An integrated semi-independent suspension and drivetrain system of claim 40, wherein said driven sprocket includes radially extending flanges, a radial dimension of said radially extending flanges being at least equal to a radial dimension of a plurality of teeth on said driven sprocket.

43. An integrated semi-independent suspension and drivetrain system of claim 36, wherein said brake assembly includes a left brake disk disposed on a left side of said driven sprocket and is adapted to frictionally engage a left side of said driven sprocket, and a right brake disk disposed on a right side of said driven sprocket and is adapted to frictionally engage a right side of said driven sprocket.

44. An integrated semi-independent suspension and drivetrain system of claim 43, wherein at least one of said left brake disk and said right brake disk is rotationally fixed relative to said axle assembly.

45. An integrated semi-independent suspension and drivetrain system of claim 43, wherein at least one of said left brake disk and said right brake disk are floating disks and said caliper is a floating caliper.

46. An integrated semi-independent suspension and drivetrain system of claim 43, wherein said driven sprocket includes a friction material that frictionally engage said left brake disk and said right brake disk.

47. An integrated semi-independent suspension and drivetrain system of claim 43, further comprising a floating friction disk disposed between said left brake disk and said driven sprocket and another floating friction disk disposed between said right brake disk and said driven sprocket.

48. An integrated semi-independent suspension and drivetrain system of claim 43, wherein said left brake disk and said right brake disk each include a friction material on an inner surface for frictionally engaging said driven sprocket.

49. An integrated semi-independent suspension and drivetrain system of claim 1, further including a peripheral opening on a peripheral surface of at least one of said swing arm and said axle carrier to allow at least a segment of said flexible coupling extending between said driven sprocket and said drive sprocket to be outside of at least one of said swing arm and said axle carrier.

50. An integrated semi-independent suspension and drivetrain system of claim 49, wherein said peripheral opening is dimensioned in a manner that a clearance space exists between said flexible coupling and said peripheral opening throughout a range of motion of said flexible coupling, said range of motion being defined by rotation of said axle carrier and alignment of said drive sprocket with said driven sprocket.

51. An integrated semi-independent suspension and drivetrain system of claim 1, wherein said transverse axle rotation axis of said axle assembly is elevated above said suspension roll axis.

52. An integrated semi-independent suspension and drivetrain system for a vehicle comprising:
    a swing arm with a swing mount for pivotally mounting said swing arm to the vehicle;
    an axle assembly rotatable along a transverse axle rotation axis;
    an axle carrier for mounting said axle assembly, said axle carrier being rotatably mounted to said swing arm to allow said axle assembly to roll about a suspension roll axis;
    a driven sprocket substantially centrally attached to said axle assembly for rotating said axle assembly;
    a drive sprocket for transferring rotational power to said driven sprocket;
    a flexible coupling mechanically linking said driven sprocket to said drive sprocket to allow transfer of rotational power from said drive sprocket to said driven sprocket; and
    a roll movement means for allowing said flexible coupling to maintain the mechanical link between said driven sprocket and said drive sprocket as said driven sprocket rolls about the suspension roll axis with said axle carrier;
    wherein said transverse axle rotation axis of said axle assembly is elevated above said suspension roll axis.

53. An integrated semi-independent suspension and drivetrain system of claim 52, wherein said swing arm and said axle carrier are substantially tubular in shape and said axle carrier is dimensioned to be rotatably mounted to said swing arm.

54. An integrated semi-independent suspension and drivetrain system of claim 52, wherein said axle carrier includes two axle mounting flanges for mounting said axle assembly, said driven sprocket being positioned thereinbetween.

55. An integrated semi-independent suspension and drivetrain system of claim 52, wherein said axle carrier includes at least one shock mount for mounting at least one of a shock absorber and a spring.

56. An integrated semi-independent suspension and drivetrain system of claim 55, wherein said at least one shock mount is positioned substantially along a midportion of said axle carrier at a spaced distance away from said suspension roll axis.

57. An integrated semi-independent suspension and drivetrain system of claim 55, wherein said at least one shock mount is two shock mounts which are positioned flanking said suspension roll axis on two sides.

58. An integrated semi-independent suspension and drivetrain system of claim 57, wherein said two shock mounts are positioned at a spaced distance from said suspension roll axis so that when springs are mounted to said two shock mounts, the springs resist roll rotation of said axle carrier relative to at least one of said swing arm and the vehicle.

59. An integrated semi-independent suspension and drivetrain system of claim 52, wherein said swing arm includes at least one shock mount for mounting at least one of a shock absorber and a spring.

60. An integrated semi-independent suspension and drivetrain system of claim 59, wherein said shock mount is positioned proximate to said drive sprocket.

61. An integrated semi-independent suspension and drivetrain system of claim 52, further comprising a stabilizer bar for establishing a mechanical linkage between said axle carrier and at least one of said swing arm and the vehicle in a manner to resist roll rotation of said axle carrier relative to at least one of said swing arm and the vehicle.

62. An integrated semi-independent suspension and drivetrain system of claim 61, further comprising a damper to dampen rotation of said axle carrier relative to said swing arm.

63. An integrated semi-independent suspension and drivetrain system of claim 52, wherein said flexible coupling is at least one of a drive chain and a flexible belt.

64. An integrated semi-independent suspension and drivetrain system of claim 52, wherein said axle carrier includes a tensioner for reducing slack in said flexible coupling.

65. An integrated semi-independent suspension and drivetrain system of claim 52, wherein said roll movement means includes a movable joint centrally disposed on said drive sprocket to allow alignment of said drive sprocket relative to said driven sprocket.

66. An integrated semi-independent suspension and drivetrain system of claim 65, wherein said movable joint is at least one of a constant velocity (CV) joint, a universal joint (U-Joint), and a curvic spline joint (CSJ).

67. An integrated semi-independent suspension and drivetrain system of claim 65, further including a guide adapted to align said drive sprocket with said driven sprocket, said guide being provided on a guide mount which extends from said axle carrier to said drive sprocket.

68. An integrated semi-independent suspension and drivetrain system of claim 52, wherein said axle assembly includes a left axle and a right axle and said driven sprocket includes a differential gear system to allow said left axle to rotate at a different rotational speed compared to said right axle.

69. An integrated semi-independent suspension and drivetrain system of claim 68, wherein said differential gear system comprises a plurality of pinion gears, at least one of said left axle and said right axle includes a sun gear at one end for engaging said plurality of pinion gears and at least one of said left axle and said right axle includes a ring gear at one end for engaging said plurality of pinion gears.

70. An integrated semi-independent suspension and drivetrain system of claim 69, wherein said pinion gears are caged between said sun gear and said ring gear.

71. An integrated semi-independent suspension and drivetrain system of claim 69, wherein said pinion gears rotate on axes that remain parallel to said transverse axle rotation axis.

72. An integrated semi-independent suspension and drivetrain system of claim 52, further comprising a brake assembly for exerting a braking force on said driven sprocket to resist rotation of said driven sprocket.

73. An integrated semi-independent suspension and drivetrain system of claim 72, wherein said driven sprocket includes a brake surface, and said brake assembly includes a brake caliper with brake pads for frictionally engaging said brake surface of said driven sprocket.

74. An integrated semi-independent suspension and drivetrain system of claim 72, wherein said driven sprocket includes at least one of an axially extending flanges and radially extending flanges adjacent to said flexible coupling around a periphery of said driven sprocket.

75. An integrated semi-independent suspension and drivetrain system of claim 52, wherein said swing arm includes a peripheral opening on a peripheral surface of at least one of said swing arm and said axle carrier to allow at least a segment of said flexible coupling extending between said driven sprocket and said drive sprocket to be outside of at least one of said swing arm and said axle carrier.

76. An integrated semi-independent suspension and drivetrain system of claim 75, wherein said peripheral opening is dimensioned in a manner that a clearance space exists between said flexible coupling and said peripheral opening throughout a range of motion of said flexible coupling, said range of motion being defined by rotation of said axle carrier and alignment of said drive sprocket with said driven sprocket.

* * * * *